US007735048B1

(12) United States Patent
Zhang et al.

(10) Patent No.: US 7,735,048 B1
(45) Date of Patent: Jun. 8, 2010

(54) ACHIEVING FAST PARASITIC CLOSURE IN A RADIO FREQUENCY INTEGRATED CIRCUIT SYNTHESIS FLOW

(75) Inventors: Gang Zhang, Pittsburgh, PA (US); Enis Aykut Dengi, Tempe, AZ (US); Ronald A. Rohrer, Saratoga, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 1007 days.

(21) Appl. No.: 10/997,639

(22) Filed: Nov. 24, 2004

Related U.S. Application Data

(60) Provisional application No. 60/524,508, filed on Nov. 24, 2003.

(51) Int. Cl.
*G06F 17/50* (2006.01)
(52) U.S. Cl. ............................................. 716/18; 703/2
(58) Field of Classification Search .................. 716/18, 716/4–6, 1; 703/13, 2
See application file for complete search history.

(56) References Cited

U.S. PATENT DOCUMENTS

| | | | | |
|---|---|---|---|---|
| 4,827,428 A | * | 5/1989 | Dunlop et al. ................. | 716/6 |
| 5,548,539 A | * | 8/1996 | Vlach et al. .................... | 703/6 |
| 5,751,593 A | * | 5/1998 | Pullela et al. .................. | 716/6 |
| 5,754,826 A | * | 5/1998 | Gamal et al. .................. | 703/14 |
| 5,764,532 A | * | 6/1998 | Patel ............................ | 716/9 |
| 5,787,008 A | * | 7/1998 | Pullela et al. ................. | 703/19 |
| 5,790,436 A | * | 8/1998 | Chen et al. .................... | 716/5 |
| 5,896,300 A | * | 4/1999 | Raghavan et al. ............. | 716/10 |
| 5,987,086 A | * | 11/1999 | Raman et al. ................. | 716/1 |
| 6,018,623 A | * | 1/2000 | Chang et al. .................. | 716/6 |
| 6,209,123 B1 | * | 3/2001 | Maziasz et al. ............... | 716/14 |
| 6,272,668 B1 | * | 8/2001 | Teene .......................... | 716/10 |
| 6,282,693 B1 | * | 8/2001 | Naylor et al. ................. | 716/8 |
| 6,286,126 B1 | * | 9/2001 | Raghavan et al. ............. | 716/6 |
| 6,353,917 B1 | * | 3/2002 | Muddu et al. ................. | 716/6 |
| 6,374,395 B1 | * | 4/2002 | Wang .......................... | 716/11 |
| 6,430,729 B1 | * | 8/2002 | Dewey et al. ................. | 716/4 |
| 6,588,002 B1 | * | 7/2003 | Lampaert et al. .............. | 716/8 |
| 6,591,402 B1 | * | 7/2003 | Chandra et al. ............... | 716/5 |

(Continued)

OTHER PUBLICATIONS

Aktuna, Mehmet et al. (Apr. 1999) "Device-Level Early Floorplanning Algorithms for RF Circuits," IEEE Transactions on Computer-Aided Design of Integrated Circuits and Systems, 18(4): 375-388.

(Continued)

*Primary Examiner*—Vuthe Siek
*Assistant Examiner*—Patrick Sandoval
(74) *Attorney, Agent, or Firm*—Stephen C. Durant

(57) ABSTRACT

Methods achieve fast parasitic closure in IC (integrated circuit) synthesis flow with particular application to RFIC (radio frequency integrated circuit) synthesis flow. Parasitic corners generated based on earlier layout statistics are incorporated into circuit resizing to enable parasitic robust designs. The worst-case parasitic corners are generated efficiently without expensive statistical computations. A performance-driven placement with simultaneous fast rough routing and device tuning generates high quality placements and compensates for layout induced performance degradations. A regression-tree based macromodeling methodology is introduced for modeling of electrical performances to enable true performance-driven layout synthesis. To improve sampling quality, an annealing-based placer can be used to perform sampling. The modeling methodology can be adapted to include automatically adjusting the device tuning ranges to meet certain model accuracy requirements.

31 Claims, 24 Drawing Sheets

U.S. PATENT DOCUMENTS

| | | | |
|---|---|---|---|
| 6,725,438 B2 * | 4/2004 | van Ginneken | 716/10 |
| 6,751,744 B1 * | 6/2004 | Allen et al. | 713/401 |
| 6,789,248 B1 * | 9/2004 | Lu et al. | 716/18 |
| 6,901,570 B2 * | 5/2005 | Lu | 716/6 |
| 7,003,745 B2 * | 2/2006 | Subasic et al. | 716/4 |
| 7,137,097 B1 * | 11/2006 | Aji et al. | 716/12 |
| 7,206,731 B2 * | 4/2007 | Sercu et al. | 703/14 |
| 7,243,320 B2 * | 7/2007 | Chiu et al. | 716/4 |
| 7,331,029 B2 * | 2/2008 | Amit et al. | 716/11 |
| 7,340,698 B1 * | 3/2008 | Srinivasan et al. | 716/4 |
| 7,356,784 B1 * | 4/2008 | Dengi et al. | 716/2 |
| 7,360,191 B2 * | 4/2008 | Chang et al. | 716/6 |
| 7,480,605 B2 * | 1/2009 | Angyal et al. | 703/14 |
| 2002/0104063 A1 * | 8/2002 | Chang et al. | 716/4 |
| 2003/0188280 A1 * | 10/2003 | Lu | 716/6 |
| 2004/0167756 A1 * | 8/2004 | Yonezawa | 703/2 |
| 2007/0124707 A1 * | 5/2007 | Sutjahjo et al. | 716/4 |

OTHER PUBLICATIONS

Breiman et al. (1984) "Regression Trees," and "Bayes Rules and Partitions," Chapters 8 and 9 In, *Classification and Regression Trees*, Peter J. Bickel, et al. eds., Wadsworth International Group; Belmont, California, pp. v-vii (table of contents) and pp. 216-278.

Charbon, Edoardo et al. (1992) "A Constraint-Driven Placement Methodology for Analog Integrated Circuits," IEEE 1992 Custom Integrated Circuits Conference, 28.2.1-28.2.4.

Cohn, John M. et al. (Mar. 1991) "Koan/Anagram II: New Tools for Device-Level Analog Placement and Routing," IEEE Journal of Solid-State Circuits, 26(3): 330-342.

Daems, Walter et al. (Nov. 2001) "Simulation-based Automatic Generation of Signomial and Posynomial Performance Models for Analog Integrated Circuit Sizing," ACM/IEEE ICCAD, pp. 70-74.

Dharchoudhury, Abhijit et al. (Apr. 1995) "Worst-Case Analysis and Optimization of VLSI Circuit Performances," IEEE Transactions on Computer-Aided Design of Integrated Circuits and Systems, 14(4): 481-492.

Eshbaugh, Kevin S. (Oct. 1992) "Generation of Correlated Parameters for Statistical Circuit Simulation," IEEE Transactions on Computer-Aided Design, 11(10): 1198-1206.

Gielen, Georges G. E. et al. (Dec. 2000) "Computer-Aided Design of Analog and Mixed-Signal Integrated Circuits," Proceedings of the IEEE, 88(12): 1825-1852.

Ivakhnenko, A. G. (Oct. 1971) "Polynomial Theory of Complex Systems," IEEE Transactions on Systems, Man, and Cybernetics, SMC-1(4) 364-378.

Krasnicki, Michael et al. (Jun. 1999) "Maelstrom: Efficient Simulation-Based Synthesis for Custom Analog Cells," Proceedings ACM/IEEE Design Automation Conference, 6 pages.

Lampaert, Koen et al. (Jul. 1995) "A Performance-Driven Placement Tool for Analog Integrated Circuits," IEEE Journal of Solid-State Circuits, 30(7): 773-780.

Liu, Hongzhou et al.. (Jun. 2002) "Remembrance of Circuits Past: Macromodeling by Data Mining in Large Analog Design Spaces," IEEE/ACM DAC 2002, pp. 437-442.

Lokanathan, A. N. et al. (1995) "Efficient Worst Case Analysis of Integrated Circuits," Proceedings of the IEEE 1995 Custom Integrated Circuits Conference, pp. 237-240.

Low, K. K. et al. (Jul. 1991) "A New Methodology for Design Centering of IC Fabrication Processes," IEEE Transactions on Computer-Aided Design, 10(7): 895-903.

Sait, Sadiq M. et al. (1995), *VLSI Physical Design Automation: Theory and Practice*, IEEE Press, Piscataway, New Jersey, USA, pp. 211-223.

*Spectre RF User's Manual*, Cadence Design Systems, San Jose, California, Jun. 2003, pp. 1-112.

Vancorenland, P. et al. (2001) "A Layout-aware Synthesis Methodology for RF Circuits," IEEE ICCAD, pp. 358-362.

Worsham, A. Hodge et al. (2002) "A Parasitic-Aware Synthesis-Based Analog Design Flow," 2002 IEEE Custom Integrated Circuits Conference, May 12-15, 2002, Orlando, Florida, 4 pages.

Wyss, Gregory D. et al. (Feb. 1998), *A User's Guide to LHS: Sandia's Latin Hypercube Sampling Software*, Sandia National Laboratories, Albuquerque, New Mexico, USA, entire document.

Zhang, Gang (May 2004), *An RF Synthesis Flow Toward Fast Parasitic Closure*, Ph.D. Dissertation, Electrical and Computer Engineering, Carnegie Mellon University, Pittsburgh, Pennsylvania, USA, entire document.

* cited by examiner

RESIZE WITH/WITHOUT PARASITIC CORNERS

|  |  | Spec. | 1st Sizing | 1st Layout | Resizing | Test1 | Test2 | Test3 |
|---|---|---|---|---|---|---|---|---|
| with corners | S11(dB) | -15 | -16.7 | -12.7 | -16.9 | -15.3 | -15.6 | -15.1 |
| with corners | S22(dB) | -15 | -18.7 | -11.3 | -15.7 | -18.4 | -15.2 | -14.8 |
| without corners | S11(dB) | -15 | 0 | 0 | -16.1 | -14.1 | -14.8 | -13.7 |
| without corners | S22(dB) | -15 | - | - | -19.5 | -15.4 | -12.9 | -11.6 |

Figure 16

THE RESULTANT RESIZED DESIGNS WITH/WITHOUT PARASITIC CORNERS.

| Designable Parameters | with Parasitic Corners | without parasitic corners |
|---|---|---|
| Q0 Emitter Length (μm) | 13 | 11 |
| Q1 Emitter Length (μm) | 13 | 8 |
| L0 Diameter (μm) | 320 | 330 |
| L1 Diameter (μm) | 140 | 130 |
| L2 Diameter (μm) | 240 | 270 |
| C0 Width (μm) | 18 | 12 |
| R Resistor (Ω) | 4 | 2 |
| ICC (mA)* | 8.5 | 8.5 |

*current is fixed for both resizing runs.

Figure 17

SYNTHESIS RESULTS OF THE X-BAND LNA.

| Performances | Spec. | 1st Size | 1st Place | 2nd Size | 2nd Place | final layout |
|---|---|---|---|---|---|---|
| S11 (dB) | -10 | -13.7 | -9.1 | -12.2 | -11.3 | -10.5 |
| S21 (dB) | 15 | 16.0 | 14.5 | 16.1 | 16.0 | 15.9 |
| S22 (dB) | -10 | -17.2 | -18.7 | -13.5 | -11.5 | -10.9 |
| S12 (dB) | -30 | -35 | -33 | -33 | -34 | -36 |
| Noise Figure (dB) | 2 | 1.88 | 1.90 | 1.93 | 1.90 | 1.91 |
| IIP3 (dBm) | 0 | 3.1 | 4.0 | 4.2 | 3.9 | 3.1 |
| ICP1dB (dBm) | -10 | -8 | -8.5 | -7.8 | -8.9 | -9.4 |
| Total Current (mA) | 15 | 12.5 | 12.5 | 12.5 | 12.5 | 12.5 |
| Run Time (S) | - | 3100 | 350 | 1900 | 190 | - |

Figure 19

DESIGN VARIABLE RANGES AND SIZED/TUNED DESIGNS.

| Design Variables | 1st Sizing | | 2nd Sizing | | Device Tuning | |
|---|---|---|---|---|---|---|
| | Min:Step:Max | Sized Design | Min:Step:Max | Sized Design | Min:Step:Max | Sized Design |
| Q0 Em. Len.(μm) | 2:1:10 | 5 | 2:1:8 | 5 | 4:1:6 | 5 |
| Q1 Em. Len.(μm) | 5:1:20 | 12 | 8:1:16 | 13 | 12:1:14 | 12 |
| L0 Diameter (μm) | 100:10:200 | 160 | 140:10:180 | 160 | 140:10:170 | 160 |
| L1 Length (μm) | 100:20:300 | 220 | 170:10:270 | 200 | 170:10:230 | 200 |
| L2 Diameter (μm) | 100:10:200 | 120 | 100:10:150 | 130 | 120:10:130 | 130 |
| C0 Width (μm) | 10:1:25 | 15 | 10:1:20 | 16 | 14:1:17 | 16 |
| Ibias (mA) | 1:0.1:3 | 2.5 | 2.3:0.1:2.7 | 2.5 | 2.5 | 2.5 |

Figure 20

MACROMODEL VARIABLES AND RANGES.

| Variables | Min | Max | Variables | Min | Max |
|---|---|---|---|---|---|
| Q0 Em. Len.(µm) | 4 | 6 | Net 2 (µm) | 50 | 200 |
| Q1 Em. Len.(µm) | 12 | 15 | Net 3 (µm) | 50 | 200 |
| L0 Diameter (µm) | 130 | 170 | Net 4 (µm) | 50 | 300 |
| L1 Length (µm) | 170 | 230 | Net 5 (µm) | 50 | 300 |
| L2 Diameter (µm) | 120 | 140 | Net 6 (µm) | 50 | 150 |
| C0 Width (µm) | 14 | 170 | Net 7 (µm) | 10 | 100 |
| Net 0 (µm) | 50 | 200 | Net 8 (µm) | 10 | 100 |
| Net 1 (µm) | 50 | 150 | | | |

Figure 21

MODELING RESULTS.

| Performances | Max Error | Mean Error |
|---|---|---|
| S11 | 4.3% | 0.9% |
| S22 | 7.1% | 2.2% |
| S21 | 1.4% | 0.5% |
| NF | 0.7% | 0.1% |
| IIP3 | 3.2% | 0.9% |

Figure 23

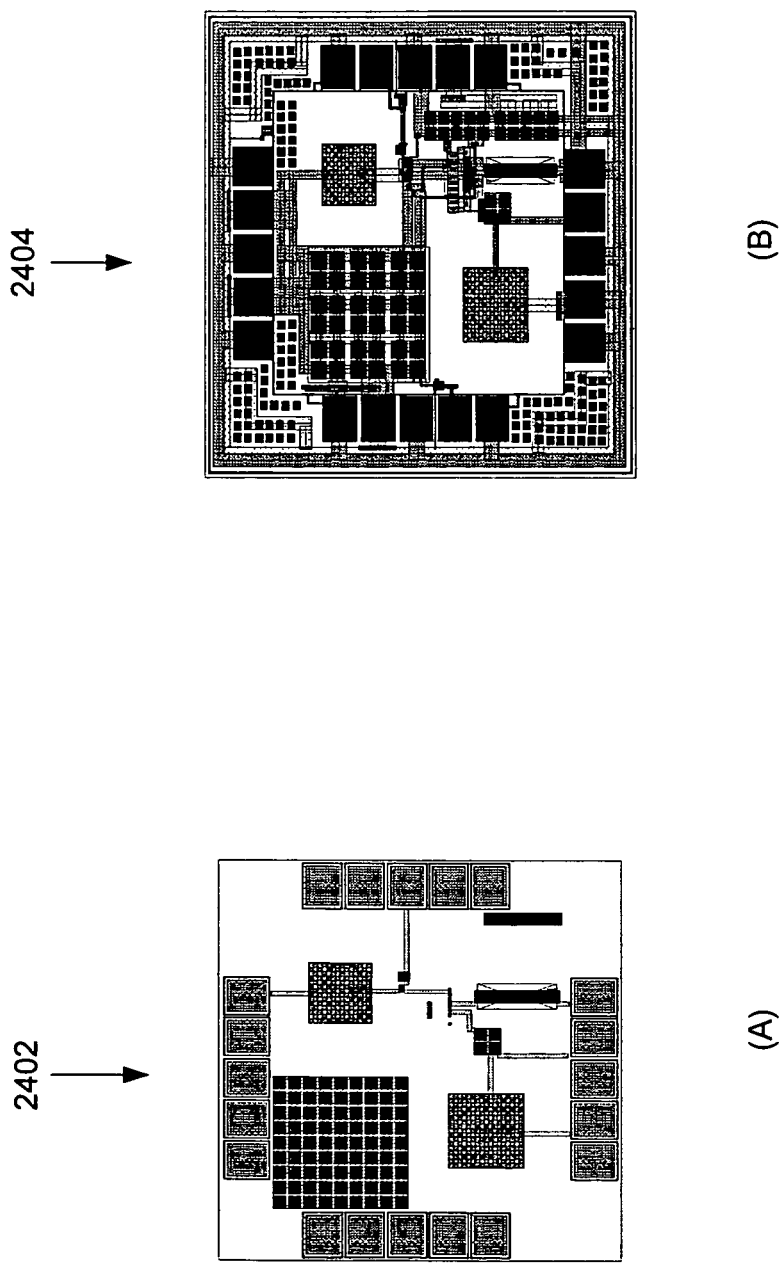
Figure 24. THE RESULTING PLACEMENT WITH ROUGH ROUTING (A), AND FINAL LAYOUT (B).

ACHIEVING FAST PARASITIC CLOSURE IN A RADIO FREQUENCY INTEGRATED CIRCUIT SYNTHESIS FLOW

CROSS-REFERENCE TO RELATED APPLICATIONS

This application claims the benefit of provisional application 60/524,508, filed Nov. 24, 2003, and incorporated herein by reference in its entirety.

BACKGROUND OF THE INVENTION

1. Field of Invention

The present invention relates to integrated circuits generally and more particularly to synthesis of radio-frequency integrated circuits.

2. Description of Related Art

The explosive growth of the communication markets and the demands for increasing connectivity and mobility have made RFIC (radio-frequency integrated circuit) designs ubiquitous in today's IC (integrated circuit) designs for applications ranging from mobile phones to laptop computers. The digital portion of the IC's can be designed with well-developed automation tools, while the analog and RF (radio frequency) portion is usually the bottle neck due to the lack of design automation. Over the last decade, there has been tremendous progress in the area of analog and RF design automation. (G. G. E. Gielen, R. A. Rutenbar, "Computer-Aided Design of Analog and Mixed-Signal Integrated Circuits", Proc. IEEE, Vol. 88, No. 12, December 2000.) More specifically, point tools for particular design phases such as circuit synthesis, placement and routing have been developed. However, there are still many important design issues remaining unsolved because of the lack of systematic methodologies to address the entire design process. (M. Krasnicki, R. Phelps, R. A. Rutenbar, L. R. Carley, "MAELSTROM: Efficient Simulation-Based Synthesis for Analog Cells," Proc. ACM/IEEE Design Automation Conference, June 1999.) (J. Cohn, D. Garrrod, R. A. Rutenbar, L. R. Carley, KOAN/ANAGRAMII: "New Tools for Device-Level Analog Layout", IEEE J. Solid-State Cir., March 1991) (K. Lampaert, G. Gielen, W. M. Sansen, "A Performance-Driven Placement Tool for Analog Integrated Circuits", IEEE J. Solid-State Circuits, Vol. 30, No. 7, July 1995.)

One such issue is parasitic closure, which refers to the requirement that a laid-out design must meet circuit performance specifications after taking the layout parasitics into account. The difficulty of parasitic closure is a direct result of the tight coupling between circuit sizing and layout, which is manifested in practically every RF circuit design. With conventional design methodologies, multiple iterations between front-end circuit sizing and back-end layout are normally required for RF designs to achieve parasitic closure. Since the newly developed RF circuit and layout synthesis point tools still treat circuit sizing and layout as separate tasks, the difficulty of parasitic closure remains a great challenge, especially for high-speed analog and radio-frequency circuits.

Conventionally, to account for layout effects, parasitics are extracted from an initial layout and included in the subsequent resizing. Such iterations are repeated until convergence is achieved. Since each circuit resizing only takes into account the parasitics of one layout, in particular the layout for the previous design cycle, convergence remains unpredictable. This calls for a more robust and efficient parasitic-aware circuit resizing approach. On the layout side, sensitivity based performance-driven layout techniques have been proposed to address electrical concerns. (K. Lampaert, G. Gielen, W. M. Sansen, "A Performance-Driven Placement Tool for Analog Integrated Circuits", IEEE J. Solid-State Circuits, Vol. 30, No. 7, July 1995.) However such performance constraints usually over-constrain the layout without acknowledging that parasitic effects can often be compensated for by device resizing. In addition, linear sensitivity based performance models are too rudimentary to model performances with sufficient accuracy. Consequently, more accurate higher-order performance macromodels are necessary. Another issue with a conventional layout methodology is the separation of placement and routing. Interconnect parasitics cannot be estimated with sufficient accuracy during placement without routing details. Consequently, such an approach cannot achieve satisfactory placements when interconnect parasitics are critical to performance as in the case of RF circuits. Conventional approaches have combined placement and routing in substantially limited contexts. (M. Aktuna, R. A. Rutenbar, L. R. Carley, "Device-Level Early Floorplanning Algorithms for RF Circuits", IEEE Trans. CAD, Vol. 18, No. 4, April, 1999.) (P. Vancorenland, G. Van der Plas, M. Steyaert, G. Gielen, W. Sanen, "A layout-aware synthesis methodology for RF circuits", IEEE ICCAD, 2001.)

Thus, there is a need for improved synthesis for radio-frequency integrated circuits, including parasitic-aware circuit resizing, more accurate higher-order performance macromodels, performance-driven RF layout designs, and methods that integrate these aspects in an overall design process.

SUMMARY OF THE INVENTION

In one embodiment of the present invention, a method for synthesizing an IC includes: determining a first layout for the IC, and determining a second layout for the IC. The first layout includes a first specification of device parameters, placement, and routing, and the second layout includes a second specification of device parameters, placement, and routing. Determining the first layout includes determining parasitic statistical data from a first-layout process. Determining the second layout includes: determining a plurality of parasitic corners from the parasitic statistical data of the first-layout process, where each parasitic corner characterizes a worst-case sample for a performance model, determining the device parameters for the second layout by using the parasitic corners to resize the device parameters of the first layout; and determining the placement and routing for the second layout after determining the device parameters for the second layout.

In another embodiment of the present invention, a method of determining a characteristic parasitic sample for a performance index includes: generating parasitic samples for an IC layout, where the IC layout includes a specification of device parameters, placement, and routing, determining macromodels for determining performance-index values for the parasitic samples; and determining a characteristic parasitic sample for the performance index. Determining the characteristic parasitic sample includes: sorting the parasitic samples into a multiple bins according to performance-index values; selecting a worst-case bin corresponding to a worst-case probability; and selecting the characteristic sample from the worst-case bin.

In another embodiment of the present invention, a method of determining a macromodel for an IC includes: determining a model form that includes an output, multiple coefficients, and multiple inputs that have corresponding input ranges; generating sample values for the model form; and determining a model across the input ranges. Determining the model across the input ranges includes determining coefficient values from the sample values for the model form across the input ranges so that the model form and the coefficient values define the model across the input ranges. The method includes checking an accuracy criterion for the model across the input ranges. If the accuracy criterion for the model across the input ranges is not satisfied, the method includes determining a partitioned model across partitioned input ranges, where determining the partitioned model across the partitioned input ranges includes determining partitioned input ranges for the inputs, and determining partitioned coefficient values for the model form across the partitioned input ranges so that the model form and the partitioned coefficient values define the partitioned model across the partitioned input ranges.

In the above methods, the IC may be further specified as an RFIC. Additional embodiments include a computer-readable medium that stores executable instructions to carry out one of the above methods and an apparatus that carries out one of the above methods.

In this way the present invention provides improved synthesis for integrated circuits including radio frequency integrated circuits.

BRIEF DESCRIPTION OF THE DRAWINGS

FIGS. 11, 12, 13, 14, 15, 16, and 17 show further details of the embodiment shown in FIG. 10.

FIGS. 19, 20, 21, 22, 23, and 24 show further details of the embodiment shown in FIG. 18.

DETAILED DESCRIPTION OF EXEMPLARY EMBODIMENTS

1 Synthesis Flow Model

Figure 1:
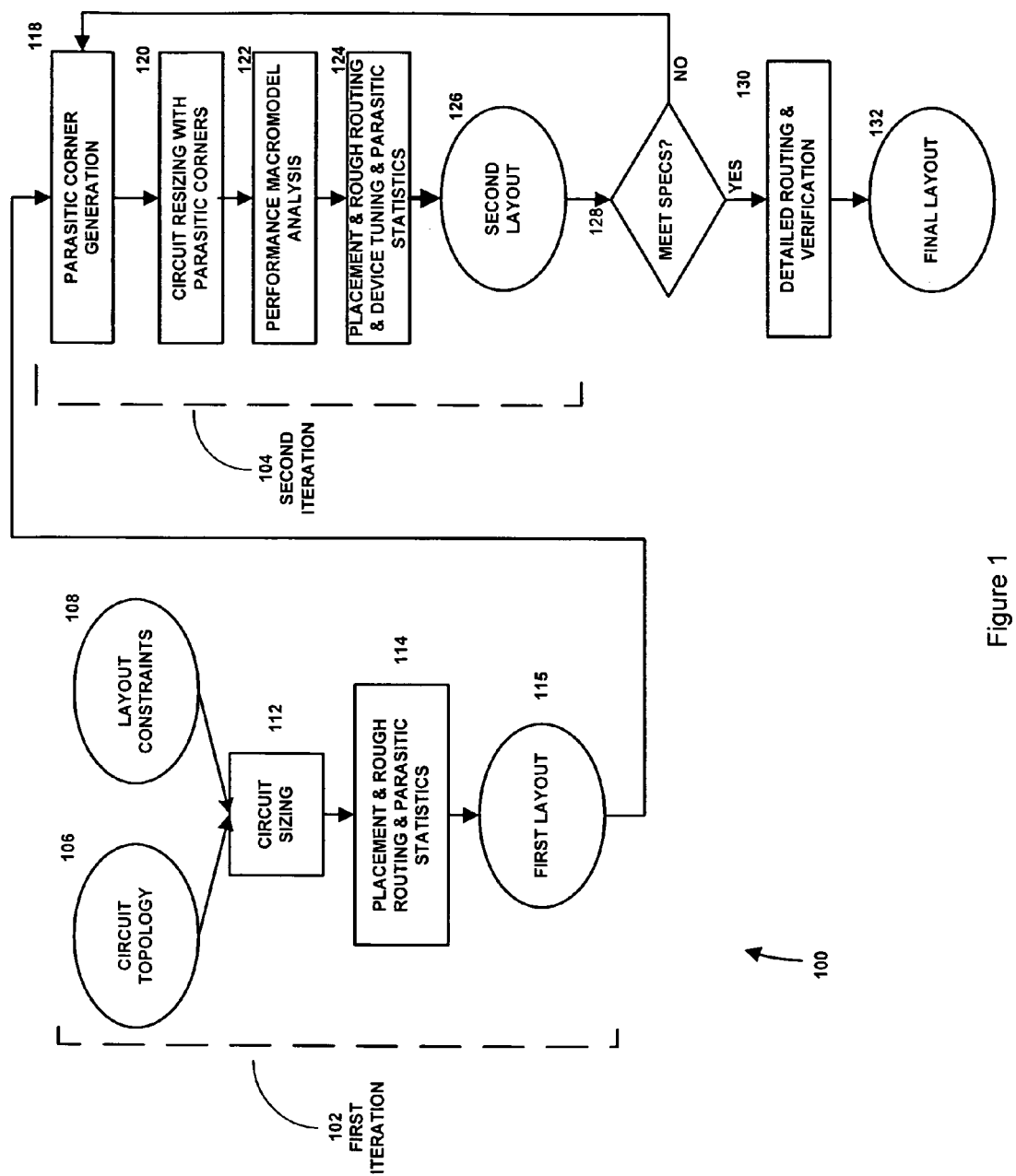
FIG. 1 shows a method for RFIC synthesis according to an embodiment of the present invention.

A method 100 for RFIC synthesis according to an embodiment of the present invention is shown in FIG. 1. The method includes a first iteration 102 and a second iteration 104. The resulting layouts 116, 126 each include a specification of device parameters, placement and routing for an RFIC.

Inputs for the first iteration 102 include a circuit topology 106 and layout constraints 108. This step 112 is followed by a step 114 for placement and rough routing (e.g., initial routing estimates) that is combined with data collection of parasitic statistics for later analysis. A first layout 116 is produced from the first iteration 102.

The second iteration 104 begins with a step 118 for parasitic corner generation based on the parasitic statistical data collected 114 in the first iteration 102. This is followed by circuit resizing with parasitic corners 120, performance macro-modeling analysis 122, and placement with rough routing and device tuning 124. A second layout 126 is produced from the second iteration 104. The step 124 for placement with rough routing and device tuning also includes data collection of parasitic statistics for later analysis.

Next a test 128 is carried out for whether the second layout 126 meets the performance specifications. If the specifications have been met, detailed routing and verification 130 are carried out to give a final layout 132. If the specifications have not been met, then parasitic corners are generated again 118 based on the most recently generated parasitic data 124. The second iteration 104 can be repeated one or more times with the most recently generated parasitic data 124 in order to meet the performance specifications 128.

For certain preferred embodiments of the present invention, targeted applications include silicon-based RF circuits operating from a few hundred MHz to 10 GHz. Typically, one assumption is that interconnects are treated as parasitics, not as transmission line devices with exact length constraints as in MMIC's (monolithic microwave integrated circuits) operating at higher frequencies. This assumption is a reasonable one since at this frequency range the dimensions of on-chip interconnects are still far shorter than the wavelength, and for the majority of silicon-based technologies, on-chip interconnects are too lossy to be used as transmission line devices.

RF circuits in this frequency range have some unique characteristics, thus meriting special treatment in terms of both circuit and layout synthesis.

First, these RF circuits have relatively low cell-level complexity compared to analog IC's. Typical device count is around ten to twenty devices. Typical wire count is also below twenty. Lower device count contributes to lower variety in RF circuit topologies. Furthermore, cell-level RF circuits usually have fewer feasible layout topologies (floorplans) to choose from. In addition, assignments of pads or pins are usually pre-determined before layout. This further narrows the alternatives for feasible floor plans. Usually experienced RF designers have good knowledge about the possible floorplans.

Secondly, these RF circuits are generally extremely sensitive to layout parasitics since the interconnects can have a large impact on circuit performance. With conventional design methodologies, multiple circuit and layout iterations are needed to achieve parasitic closure. Because of high current and sensitivity to stray resistance, interconnects are usually much wider than those in analog IC's. Wire-widths of 5 $\mu m$ to 10 $\mu m$ are typical.

Third, RF circuits and layouts are passive-dominant. To reduce cross-coupling and increase quality, factor, inductors are typically required to have a large halo, typically 30-60 $\mu m$ around them, within which no metal layer is allowed. The module layouts of RF devices are generated and thoroughly pre-characterized by the foundry. Thus device module generation is not needed during layout. RF devices are not allow to be merged or abutted.

In FIG. 1, the method 100 includes both a first iteration 102 and a second iteration 104. However, the focus of description below is on the second iteration 104 where rapid convergence is desired. If necessary, additional iterations can be performed in the same manner as the second iteration 104. Except for some rare parasitic-insensitive RF circuits, at least two design iterations typically will be needed to achieve final parasitic closure because only limited layout information is generally available during the first circuit sizing. By tightly couple sizing 120 with placement and routing 124 in subsequent iterations, earlier parasitic closure can be achieved.

Preferably, an industrial circuit synthesis tool based on full simulations can be used for circuit sizing 112 and resizing 120. (M. Krasnicki, R. Phelps, R. A. Rutenbar, L. R. Carley, "MAELSTROM: Efficient Simulation-Based Synthesis for Analog Cells," Proc. ACM/IEEE Design Automation Conference, June 1999.) Also, a commercial RF simulator is interfaced with the sizing engine to ensure accuracy. ("Spectre RF User's Manual", Cadence Design Systems, San Jose, Calif., 2004.)

In FIG. 1, The flow starts with the circuit topology 106 and the layout constraints 108. However, the circuit topology 106 can be generalized to include other circuit constraints (e.g., performance specifications, relevant test benches, etc.), and the layout constraints 108 can be generalized to include other layout estimates (e.g., an initial floor plan, a selection of critical RF nets from which parasitics are estimated and included in the net lists for sizing, etc.). The inclusion of layout estimates is generally beneficial for convergence and is especially practical for RF circuits because the designers usually have good knowledge about the feasible floor plans. Note that the inputs 106, 108 may be used not only in the initial circuit sizing 112 but in subsequent design steps (e.g., for placement and rough routing 114).

After the first circuit sizing 112, a sensitivity analysis of performances over parasitics may also be performed although not shown in FIG. 1. In addition, more layout specific constraints 108 such as device and net symmetry, matching, orientations, etc., may be introduced. The step 114 for placement and rough routing is preferably a sensitivity-based performance-driven placement, where the placement tool can be an industrial analog placer based on simulated-annealing. (J. Cohn, D. Garrrod, R. A. Rutenbar, L. R. Carley, KOAN/ANAGRAMII: "New Tools for Device-Level Analog Layout", IEEE J. Solid-State Cir., March 1991.)

The objective of the first iteration 102 is to identify the "correct layout topology" in the first layout 116, by which we mean a layout topology where parasitic closure can be achieved without changing the layout topology. More specifically parasitic closure can be achieved through local and moderate changes in the layout and/or device sizes without incurring large global changes. This can be accomplished, first, by tapping into the designer's knowledge of feasible floorplans (e.g., as part of the layout constraints 108), and secondly through sensitivity-based performance-driven placement 114. Additionally, linear sensitivity-based performance constraints can provide, even though not very accurately, global estimates of parasitic effects. (Although not shown in FIG. 1, a sensitivity analysis of performances over parasitics may be included for this purpose after the first circuit sizing 112.) In general, the placer 116 should effectively balance parasitic effects globally for enhanced performance optimization.

As discussed earlier, in practice, fine tuning of the design with many iterations between circuit sizing and layout to achieve the final parasitic closure is often a major bottleneck in the overall design process. Typically the designer does have a good estimate for the floorplan (e.g., as included with the layout constraints 108), and the most time-consuming part of the design process is the fine tuning of the layout to achieve parasitic closure. Therefore, one general goal of the second iteration 104 is to systematically speed up parasitic closure through automatic local adjusting and fine-tuning of the circuit and layout. First, worst-case parasitic corners are generated 118 with the parasitic statistics collected 114 during the first layout run. Then a circuit resizing 120 with the parasitic corners is performed. After resizing 120, circuit macromodels 122 are constructed to model circuit performances over parasitics and selected device parameters. Next, a direct performance-driven placement with simultaneous rough routing and device tuning is performed 124 with the constructed macromodels. Once the resulting second layout 126 meets performance specifications 128, a final detailed routing can be performed 130 (e.g., manually or automatically) as a follow-up to the rough-routing 124 to complete the design and achieve a final layout 132. The assumption is that the final routing 132 will have negligible parasitic discrepancy with the rough routing, such that the parasitic closure is maintained.

The following sections provide further details related to the second iteration 104 including parasitic corner generation 118, corresponding resizing 120, performance macromodel analysis 122, and placement with rough routing and device tuning 124.

2 Statistical Parasitic-Aware Circuit Resizing with Worst-Case Parasitic Corners During the first iteration 102, data is collected from the parasitic sensitivity analysis 114. This data is subsequently used in the second iteration 104 for parasitic corner generation 118 and circuit resizing 120. In this way the present invention addresses the problem of parasitic closure early in the design process.

Conventional approaches for resizing with extracted parasitics generally take just one snapshot of the preceding layout process and use this single piece of information to predict future parasitics. By capturing a bigger picture of the parasitic values in the earlier layout iteration for the later circuit resizing (i.e., through parasitic corners), the resulting design should be much more parasitically robust and have a much greater chance of convergence. Notably, in other contexts related to IC manufacturing, a single environmental point has been used for resizing as well as multiple environmental corners. (A. N. Lokanathan and J. B. Brockman, "Efficient Worst Case Analysis of Integrated Circuits", IEEE 1995 Custom Integrated Circuits Conference).

Figure 2:
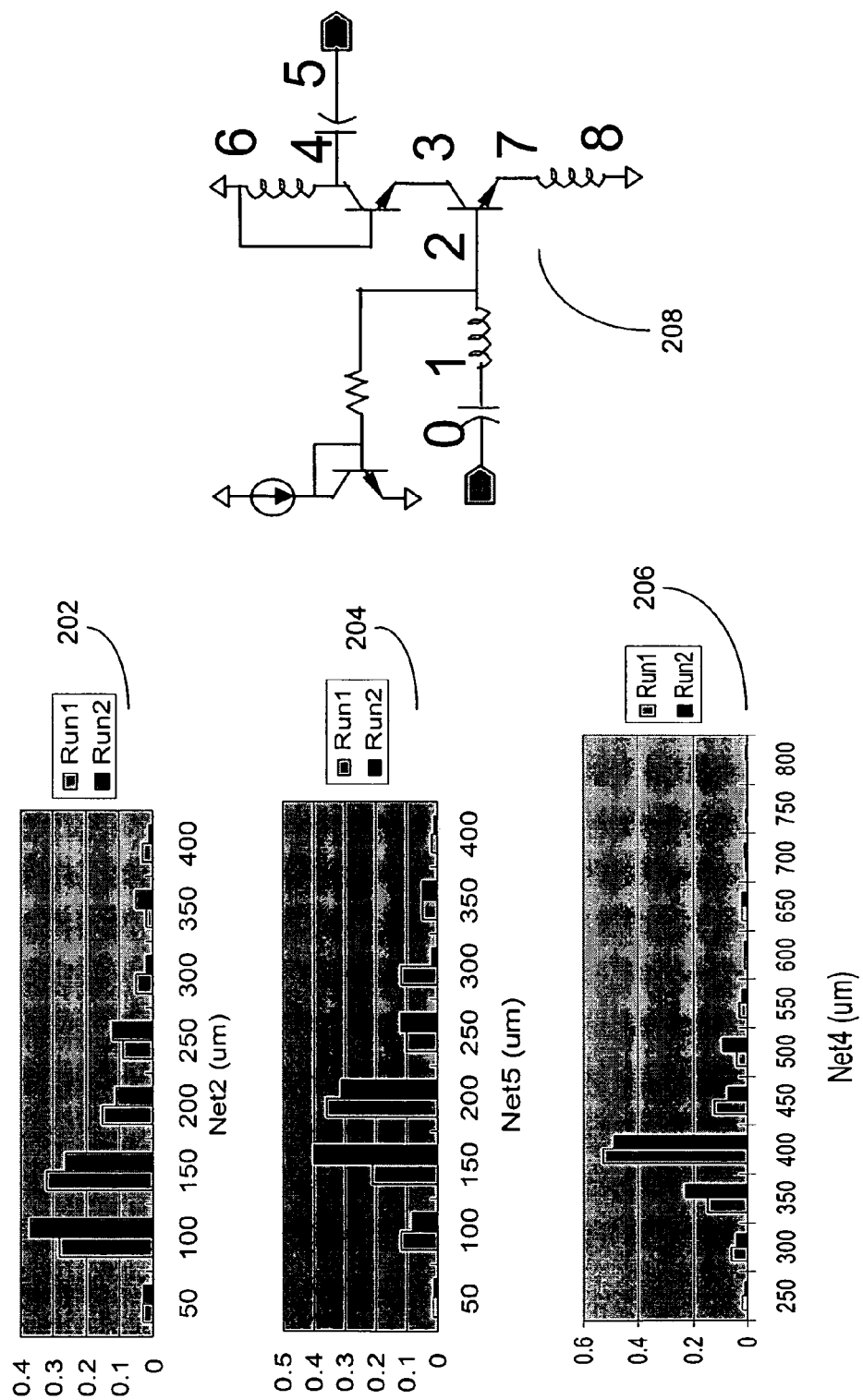
FIG. 2 shows further details of the embodiments shown in FIG. 1 and FIG. 18.

With reference to FIG. 1, statistical parasitic data is recorded 114 during the first layout synthesis 102. FIG. 2 shows probability histograms 202, 204, 206 of some RF net lengths over two successive layout runs for the example LNA circuit 208 shown in FIG. 18. These histograms 202, 204, 206 show that the distributions of net lengths between two runs match fairly well. This observation suggests that the parasitic statistics in the next layout run can be approximated by the parasitic statistics from the preceding layout run. Since the second layout synthesis 104 will be searching a smaller layout space at a lower annealing temperature, in the first layout run the statistical data is collected only after the temperature is sufficiently low to filter out the hot random data. A reasonable choice of the temperature is simply the starting temperature of the next layout run. Knowing the parasitic statistics, the circuit resizing phase between two adjacent layout runs can be formulated as a statistical parasitic-aware circuit resizing with the objective of finding a design point that meets all the specifications across the possible parasitic statistical variations.

2.1 Generation of Parasitic Corners by System Modeling

The distributions 202, 204, 206 are not normal, but still can be characterized by a nominal point where the net lengths have the highest probability, and a lower and upper bound given a total probability coverage, say 80%, in between. And, the variations are the distances from the bounds to the nominals. This information provides a good prediction of how the parasitics will vary in future layouts. More generally, these distributions are generally unimodal as long as they are collected at sufficiently low annealing temperatures. To facilitate the use of the statistical data, it is desirable to transform the raw data of parasitic variables to form Gaussian distributions. This can be done with some standard transformations. (K. S. Eshbaugh, "Generation of Correlated Parameters for Statistical Circuit Simulation", IEEE Trans. on Computer Aided Design, Vol. 11, No. 10, October, 1992.)

Knowing the distributions of parasitics and the mapping from the parasitics to the circuit performances, worst-case parasitic corners can be generated for the subsequent circuit resizing. Given a design in the presence of statistical parameter variations, for certain worst-case probabilities, the problem of finding a set of parameter values that lead to the worst performances is called worst-case analysis. (A. Dharchoudhury, S. M. Kang, "Worst-Case Analysis and Optimization of VLSI Circuit Performances", IEEE Trans. CAD, Vol. 14, No. 4, April 1995.) In this particular case, we are dealing with statistical parasitics. However, finding the exact worst-case parasitic corners is difficult mainly because of the complex mapping from parasitics to circuit performances which can only be exactly solved by expensive circuit simulations.

For example, by assuming a linear relationship between all n parasitics and m performances, a sensitivity analysis can performed at the nominal parasitic point. To specify layout induced performance degradations, performances after layout are allowed to be relaxed by $\Delta p_j$ from the original circuit sizing spec $p_j$ (j=1 to m). Since the nominal point will be optimized to meet spec $p_j$ after resizing, accordingly the worst parasitic corners need to meet the relaxed spec, $p_j$-$\Delta p_j$. We assume the distance from a parasitic corner to the nominal parasitic point along each parasitic direction is proportional to the parasitic variation in that direction with a ratio $k_j$ for performance j for all parasitics. The argument for this constant ratio for all parasitics, as opposed to different ratios for each parasitic, is that the variations of the parasitics already reflect the effect of sensitivities over distributions, e.g., higher sensitivities result in smaller parasitic variations. The worst corner can be simply calculated through solving $k_j$ as follows:

$$k_j \left( \sum_i^n s_{ij} d_i \right) = \Delta p_j \ (j = 1 \text{ to } m). \quad \text{(EQ 1)}$$

In EQ 1, $s_{ij}$ is the sensitivity of performance j to parasitic i, $d_i$ is the upper or lower variation (distance from nominal to upper/lower bound) of parasitic i as depicted in FIG. 2, and $\Delta p_j$ is the layout degradation spec for performance j. Whether the upper or lower variation is chosen depends on the sign of the particular sensitivity, thus the parasitic corner for performance j can be expressed as:

$$\text{Corner}_j = [d_1, d_2, \ldots, d_i, \ldots, d_n] \cdot k_j. \quad \text{(EQ 2)}$$

It should be noted that the correlations among parasitics are not considered here. However it is easy to see that the parasitic corners generated in this way are more pessimistic than those generated considering correlations. For each performance j, there is one worst corner and one best corner (with the same $k_j$ but in the opposite parasitic direction) both of which will be considered for resizing. During resizing, at the nominal point the goals are to meet the original performance specifications $p_i$ while at the corner points the goals are to meet the relaxed specifications $p_j$-$\Delta p_j$. Having both best and worst corners makes the synthesis more centered and robust.

The above described method for generating parasitic corners can be computationally burdensome as well as inaccurate in its characterization of parasitic effects. Analogous approaches based on solving nonlinear systems are also possible. (Gang Zhang, *An RF Synthesis Flow Toward Fast Parasitic Closure*, Ph.D. dissertation, Electrical and Computing Engineering, Carnegie Mellon University, May 2004.)

2.2 Generation of Parasitic Corners by Data Collection and Organization

Figure 3:
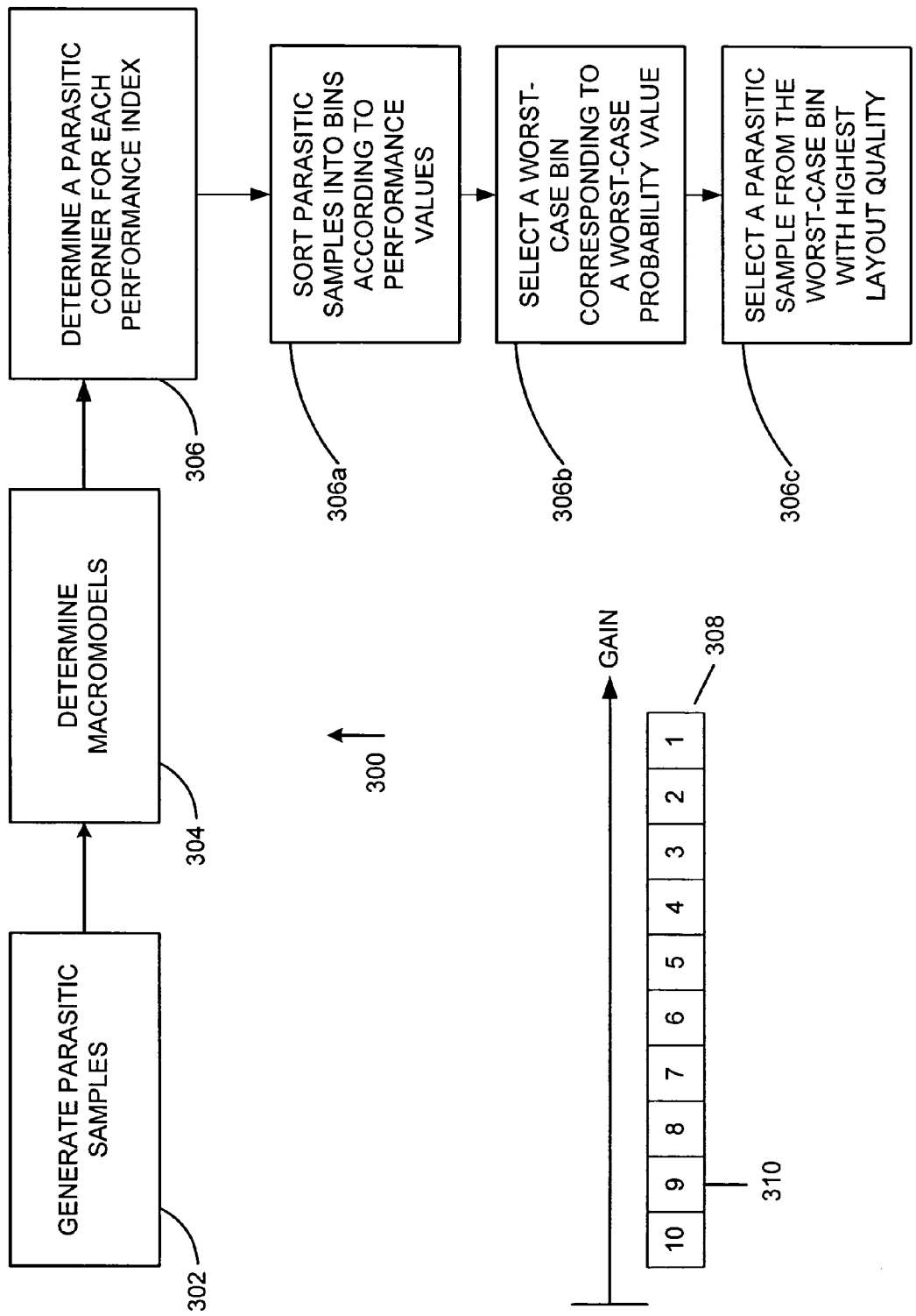
FIG. 3 shows a method for generating parasitic corners according to an embodiment of the present invention.

A method 300 for generating parasitic corners according to an embodiment of the present invention is shown in FIG. 3.

First, parasitic samples are generated 302. During placement process 116 of the first iteration 102, a large number of intermediate placements will be generated. For each intermediate placement, the parasitics are estimated and recorded. Each intermediate placement with its parasitic values is called a "parasitic sample"; The parasitic values for each sample are recorded. In addition, the indication values of the quality of each placement are recorded. The placement quality value is readily available from the placer engine since the quality of layout can be easily measured by the layout cost obtained from the total cost of the placement annealer excluding the performance cost. More details about the layout cost formulation are described below (e.g., EQ 5).

Next, macromodels are determined 304. After placement, a small portion of the parasitic samples will be simulated with circuit simulators, and, based on the simulation results, a performance model is constructed for each performance index of interest. Such a macromodel can be seen as a black box with parasitic samples as inputs and electrical performance values as outputs. Techniques for generating macromodels are discussed in below (e.g., with respect to FIGS. 4 and 5).

Next a parasitic corner is determined 306 for each performance index of interest. For the embodiment shown in FIG. 3 this can be done in three steps. First, the parasitic samples are sorted 306a into bins according to performance values. Next a worst-case bin is chosen 306b based on a worst-case probability. Finally a parasitic sample is selected 306b as the parasitic corner from the worst-case bin to optimize layout quality. These steps can be repeated for each performance index.

For example, let the first performance index be a gain that is desired to be as high as possible for a circuit. Then, ten-thousand samples can be divided into one-hundred bins with one-hundred samples in each bin so that each bin has 1% of the samples. Let the worst-case probability be set at 90%, and let the worst-case bin be the one where 10% (i.e., 100%-90%) of the samples have a lower performance value. Then, counting from the highest to lowest performance values, the ninetieth bin is the worst-case bin. From this worst-case bin a parasitic sample with the best layout value can be chosen as the corresponding parasitic corner (or "worst-case parasitic corner") for this performance index. An analogous case is illustrated in FIG. 3, where ten bins 308 are shown for gain values, and the worst-case bin is the ninth bin 310.

These steps 306 for determining a parasitic corner 306 provide one way of balancing performance and layout quality for determining a characteristic parasitic sample (i.e., a parasitic corner). However, other approaches are also possible. Also, the number of bins and the value of the "worst-case" probability are design choices that may vary according to the specific application.

This embodiment advantageously determines parasitic corners directly from the available parasitic data sets as compared with other approaches that require more extensive computations. Since the parasitic corners are selected from the real placement samples, the method provides realistic characterizations of the parasitic samples and accounts for the correlations among parasitics.

3 Performance Macromodeling for Performance-Driven Layout

In the second iteration 104, performance macromodels are used 122 for efficient modeling of system performance in the placement process 124. In general, the macromodeling problem relates to determining electrical performance values (e.g., a gain value) from given device parameters and parasitics. Circuit macromodeling has been widely used in statistical circuit design, system-level analog circuit simulation and, recently, system-level circuit synthesis. (K. K. Low, S. W. Director, "A New Methodology for the Design Centering of the IC Fabrication Process", IEEE Trans. CAD, Vol. 10, No. 7, July 1991.) (Daems, G. Gielen, W. Sansen, "Simulation-Based Automatic Generation of Signomial and Posynomial Performance Models for Analog Integrated Circuits," ACM/IEEE ICCAD, November 2001.) (H. Liu, A. Singhee, R. A. Rutenbar, L. R. Carley, "Remembrance of Circuits Past: Macromodeling by Data Mining in Large Analog Design Spaces", IEEE/ACM DAC 2002, June, 2002.)

In the present context, the macromodels 122 should preferably have sufficient accuracy and range to identify the feasible modeling ranges. The second iteration 104 of layout synthesis is more refined in the sense that it will only fine tune the layout to correct DRC errors caused by resizing, and at the same time ensure that all performance specifications are met with the new layout parasitics. For this purpose, performance goals are explicitly included in the cost functions and a much more accurate performance macromodel is needed. Since the parasitics will only vary within a relatively small range it is possible to build a sufficiently accurate model for the circuit. Since layout parasitics have a much lower impact on the circuit than device variables, modeling parasitic effects is generally an easier task than modeling the effects of device variables. For typical parasitic variation ranges in this application, a 2nd-order polynomial has proved to be sufficient. A quadratic model is obtained by fitting samples with the following general form:

$$y = a_0 + \sum_{i=1}^{n} a_i x + \sum_{i=1}^{n} \sum_{j \geq i} a_{ij} x_i x_j. \qquad (EQ\ 3)$$

In general, simple quadratic models (e.g., EQ 3) work well for modeling parasitic effects. However, to accurately model device variables, the feasible macromodeling ranges must be identified. One way of doing this, for example, is through iterative fitting.

Figure 4:
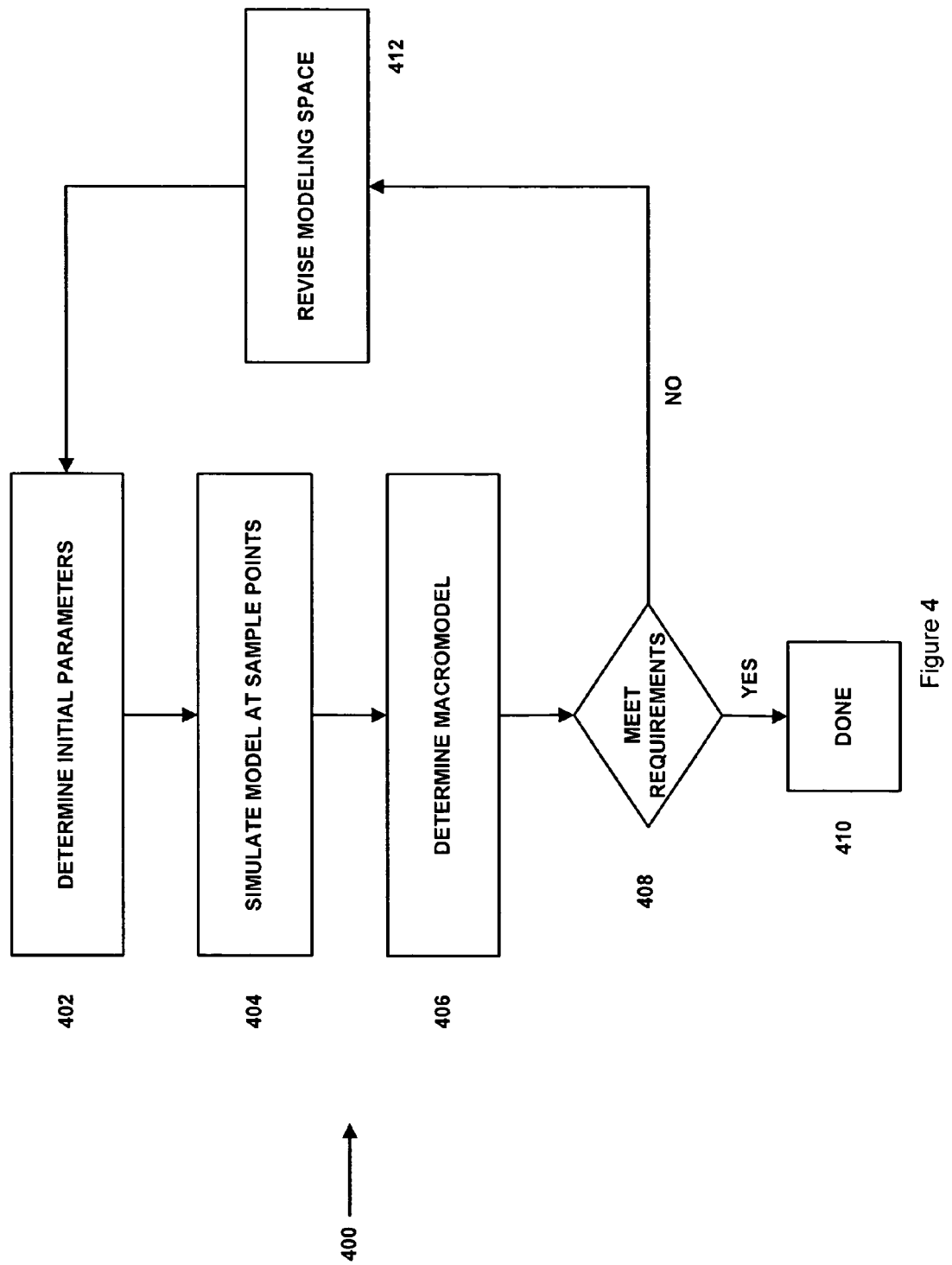
FIG. 4 shows a method for determining a macromodel according to an embodiment of the present invention.

A method 400 for determining a macromodel according to an embodiment of the present invention is shown in FIG. 4. First, an initial parameter range is determined 402. Then sample points within the chosen modeling space are simulated 404 and then regression is performed to determine the macromodel 406. Subsequently, model quality is examined 408 on verification samples. If the quality meets the set requirement, then the process terminates 410. Alternatively, If the quality is poor, the modeling space is revised accordingly 412 (e.g., shrunk uniformly in all parasitic directions) and modeling is repeated 402 until the accuracy requirement is met 408 and the process terminates 410.

Accurate macromodeling covering a wide design space presents substantial technical challenges. However, in many operational settings, one can find a restricted set of device parameters and a limited design space where the performances can be modeled with sufficient accuracy based on existing macromodeling methods. For example, one can give up modeling those device parameters that are too difficult to model or otherwise restrict their variation ranges.

Figure 5:
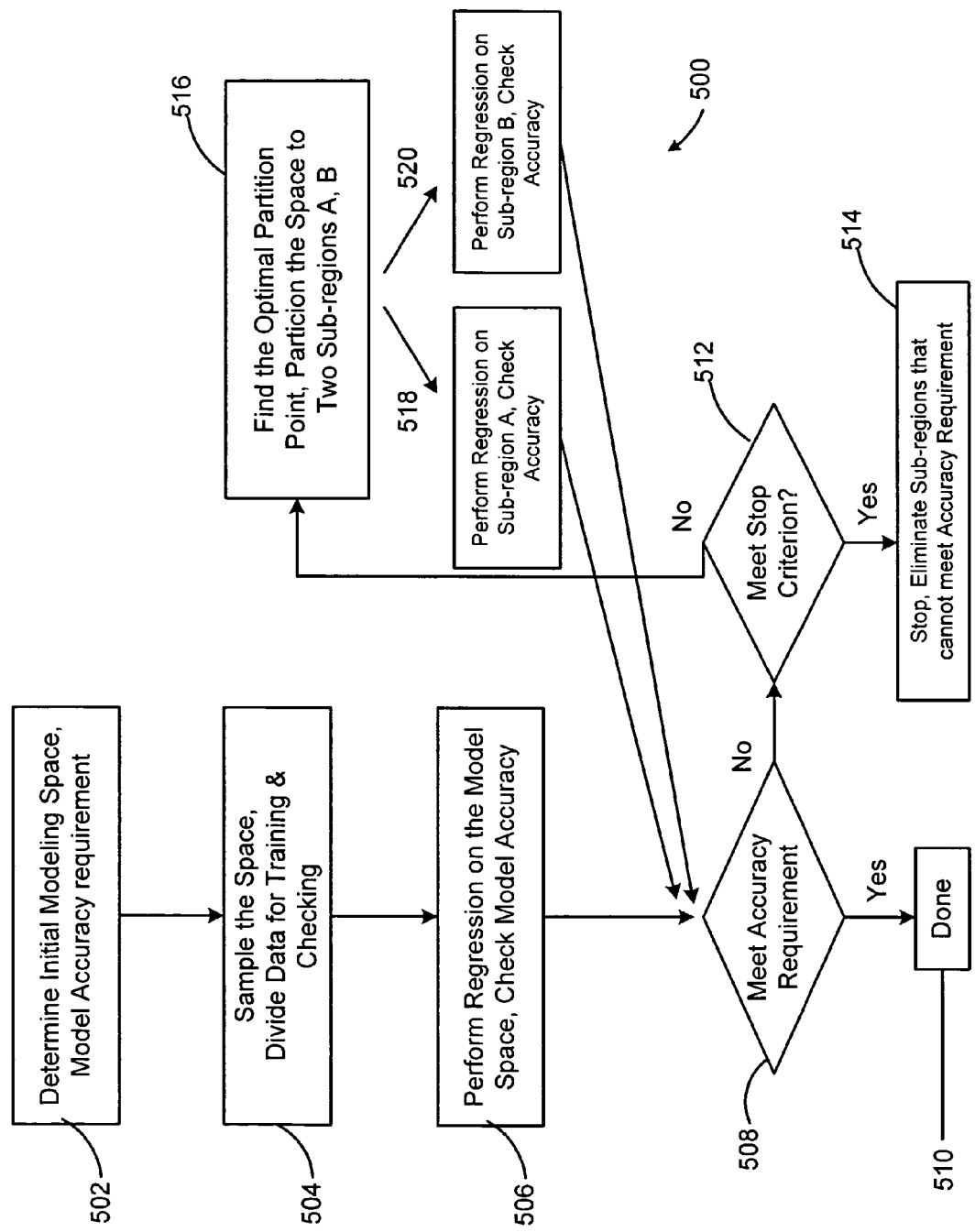
FIG. 5 shows a method for determining a macromodel based on a regression tree according to an embodiment of the present invention.

Other embodiments of the present invention relate to regression-tree based macromodelling. (L. Breiman, J. H. Friedman, R. A. Olshen, C. J. Stone, "Classification and Regression Trees", Belmont, Calif.: Wadsworth, 1984.) A method 500 for determining a macromodel based on a regression tree according to an embodiment of the present invention is shown in FIG. 5. First, the initial modeling space and the model accuracy requirement are determined 502. This includes identifying important device parameters and parasitics through critical device/parasitic analysis. Also, parasitic modeling ranges are determined from the statistical information; Initial ranges for device parameters are set to empirical default values (e.g., +/−10% around the nominal values).

Next the space is sampled 504 and divided for training and checking. That is, at each sample point, the input variable values are recorded and their corresponding performances are obtained by simulation (e.g., SPICE simulation) and recorded. The samples are divided (e.g., arbitrarily or randomly) into two groups, a first group with training data for model training and a second group with checking data for model checking. Next a regression is performed 506 on the model space with the training data to determine the model coefficients. The model accuracy requirement is then checked 508 for the resulting model by means of the checking data. For example, the checking data can be used to determine a quadratic error estimate for the model accuracy and the model accuracy requirement can be an upper bound for this error estimate. If the requirement is met, the process terminates 510.

If the model accuracy requirement is not met, a stop criterion is checked 512. The stop criterion 512, for example, can involve a maximum number of iterations, a minimum node size or a maximum branch level. If the stop criterion is satisfied (e.g., the number of iterations exceeds a threshold) then the process terminates 514. If the stop criterion is not satisfied, then an optimal partition point is determined and the space is partitioned 516 into two sub-regions (e.g., A and B) and regression are performed 518, 520 on both sub-regions and the accuracy is checked 508 in each sub-region against the model accuracy requirement. The process continues until termination 510 when the model accuracy check 508 is satisfied or termination 514 when the stop criterion is satisfied 512.

In this way, a tree-type partitioning is performed recursively on the device parameters. The parameter to be partitioned and the corresponding split point are identified 516 according to a greedy minimization of a prediction error indicator. The partitioning is terminated when a certain accuracy threshold 508 or a stop criterion 512 is met. Detailed regressions are performed on the sub-regions over training data samples and subsequently verified using checking data samples. If for some sub-regions the accuracy requirement is not met, the corresponding input parameter regions are eliminated 514 from the modeling space.

With respect to the sampling step 504, it should be noted that sampling has great impact on the quality of the resultant macromodels. It is essential to choose the sample points as representative to the actual distribution as possible. Experimental designs and variants of random sampling methods such as Monte Carlo sampling and Latin Hypercube sampling are well-known conventional sampling techniques. ("A User's Guide to LHS: Sandia's Latin Hypercube Sampling Software", Sandia National Lab., Albuquerque, N. Mex., 1998.) In this performance-driven placement application, however, since the actual parasitic variable distributions along the placement process are greatly affected by the particular design, i.e., the layout constraints involved, random sampling around the nominal parasitic point cannot provide representative samples, especially when the number of parasitic variables is relatively high (e.g., ±20). Experiments show that with the conventional sampling method such as Latin Hypercube method, modeling errors are very high when the macromodels are applied to the actual placement process, even though the macromodels are accurate with the testing samples.

To make the samples to truly represent the points to be visited during the actual placement, we use the simulated-annealing placer itself to perform the sampling. More specifically, a placement run 114 with all the placement constraints except for the performance constraints (since the performance models are not yet built) are performed. Device parameters that need to be modelled/tuned are varied by the annealer as well. During the placement 114, intermediate placements are randomly selected and their corresponding device parameter values and parasitic values are recorded as the samples. Certain measures are taken to make the samples more representative. For example, placements with cost higher than certain values are excluded and sampling is only performed after the annealing temperature is lower than certain threshold.

With our approach, since the sampling placement run 114 uses the same placement constraints as the final placement run except that it does not have the performance constraints, the samples are close to the actual placements and are much more representative.

Figure 6:
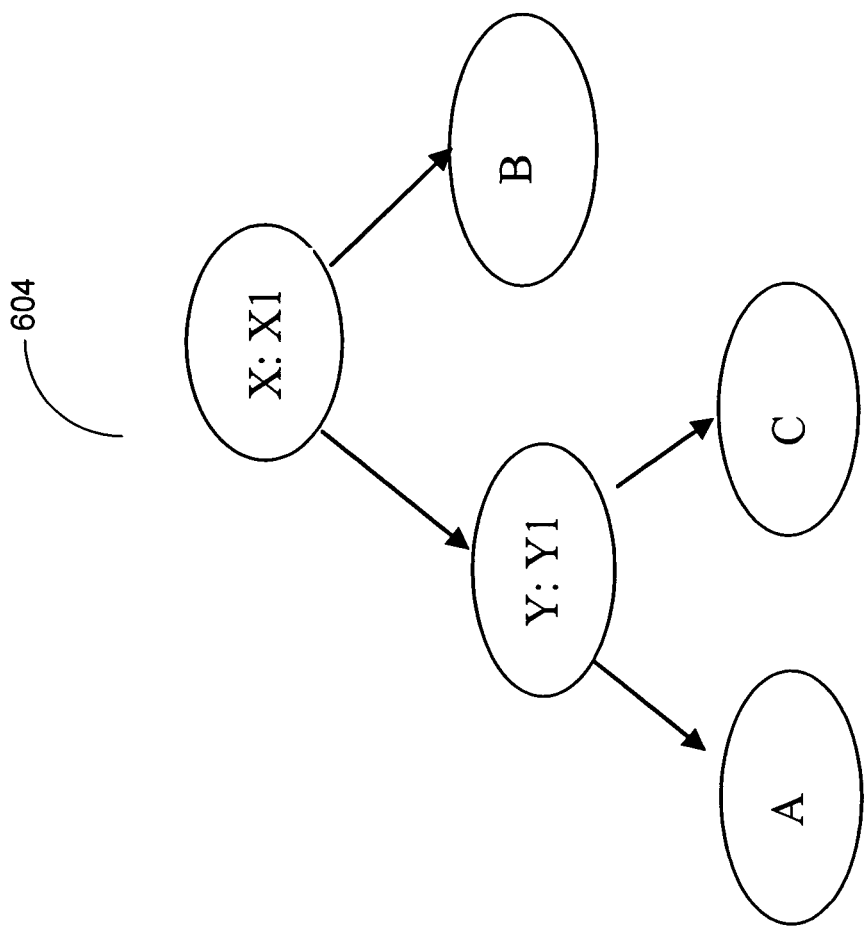
FIGS. 6, 7, 8, and 9 show further details of the embodiment shown in FIG. 5.
Figure 6:
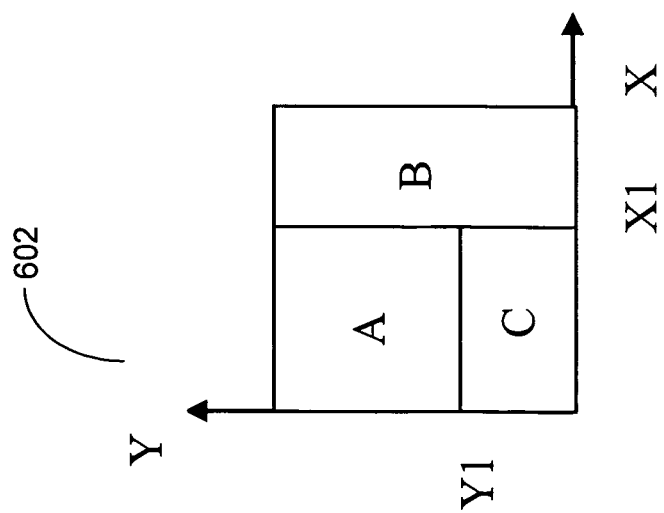

FIG. 6 shows a characteristic model partition 602 and a corresponding partition sequence for the partitioning step 516. In FIG. 6, the notation "X:X1" stands for "partition variable X at value X1." This partitioning enables greater fidelity in model fitting by employing multiple regressors to capture the data. In general, macromodels with multiple regressors are more accurate than those with single regressor. (H. Liu, A. Singhee, R. A. Rutenbar, L. R. Carley, "Remembrance of Circuits Past: Macromodeling by Data Mining in Large Analog Design Spaces", IEEE/ACM DAC 2002, June, 2002.)

Figure 7:
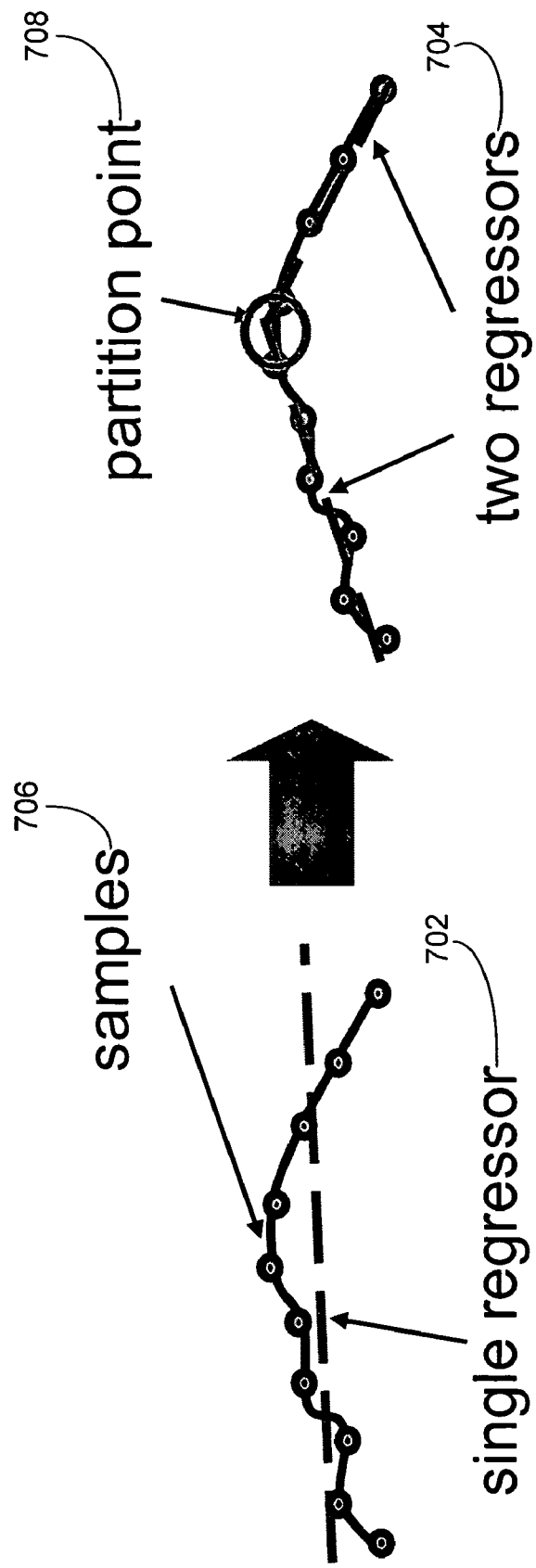

Regression-tree based methods are one type of macromodels utilizing multiple regressors. (L. Breiman, J. H. Friedman, R. A. Olshen, C. J. Stone, "Classification and Regression Trees", Belmont, Calif.: Wadsworth, 1984.) In these methods, the modeling space is partitioned into multiple sub-regions through an optimization process (i.e., model error minimization), and subsequently regressors are constructed for every sub-region. They consistently achieve higher accuracy than single regressor methods mainly because the model space in a sub-region are smoother thus easier to model, as shown in FIG. 7 where a single regressor 702 and two regressors 704 are illustrated for a number of sample points 706. In the case of two regressors 704, a partition point 708 separates the parameter region into two sub-regions and allows a better fit in each sub-region. That is, every sub-region is individually modeled and tested, thus the modeling difficulty of every sub-region can be individually evaluated. If a sub-region cannot be modeled with the required accuracy, the sub-region can be excluded from the modeling space. This feature enables automatic adjustment of model space to meet a given accuracy requirement.

Regression-tree partitioning 516 has analogously been developed in other related contexts including CART (classification and regression tree) methods. (L. Breiman, J. H. Friedman, R. A. Olshen, C. J. Stone, "Classification and Regression Trees", Belmont, Calif.: Wadsworth, 1984.) The process can be characterized as a greedy optimization with the objective to minimize certain prediction errors by partitioning the design space into certain sub-regions. First, prediction error is evaluated for the whole training data. If the error is too large, then the first level of partition is performed. To find an optimal partition variable and point, every device parameter at every legal partition point is tried and the prediction error for each resulting sub-region is evaluated. The parameter and the partition point that give the largest prediction error reduction is chosen as the first partition variable and point (e.g., as in a greedy optimization process). If the prediction errors still cannot meet certain requirement, the search is continued recursively on the obtained sub-regions. The resulting partition is a binary tree. FIG. 6 shows an example of CART partition for a model with two variables.

Determining the model accuracy 508 in each sub-region can be done by calculating the variance of the samples in each sub-region. (L. Breiman, J. H. Friedman, R. A. Olshen, C. J. Stone, "Classification and Regression Trees", Belmont, Calif.: Wadsworth, 1984.) This error indicator sometime does not reflect how difficult (or easy) the sub-region is to model; that is, a larger variance does not necessarily mean that it is harder to model. Alternatively certain regressions can be performed on each possible sub-regions and the estimation errors can be used as the prediction error indictor for partitioning. In this work linear regression is used for this purpose. The stopping criterion 512 for partitioning can be a minimum node size and a maximum number of partition levels.

To further improve the quality of the partitioning, cross-validation is used for estimations of prediction errors. Usually, we just used a portion of the data to train the regressor and subsequently use the rest to estimate the errors 506, 518, 520. However, when the data size is small, such a method is not very reliable. During the partitioning 516, the data set for the sub-regions can get rather small, thus cross-validation is needed to ensure reliability. Cross-validation does not assume any distribution of the sampled data and the error estimate is much more reliable.

The complexity of the regression-tree has to be controlled to avoid overfitting. One way is to check the improvement in the prediction error after one partition. If no improvement is achieved, the partition on that node should be stopped. Also when the prediction error is smaller than a predetermined error threshold, the process should be stopped. In addition, maximum level of partition and minimum node size can be set empirically to control the depth of the regression tree. After the modeling space is partitioned, detailed regressions are performed for every sub-region with the training samples in that sub-region.

Figure 8:
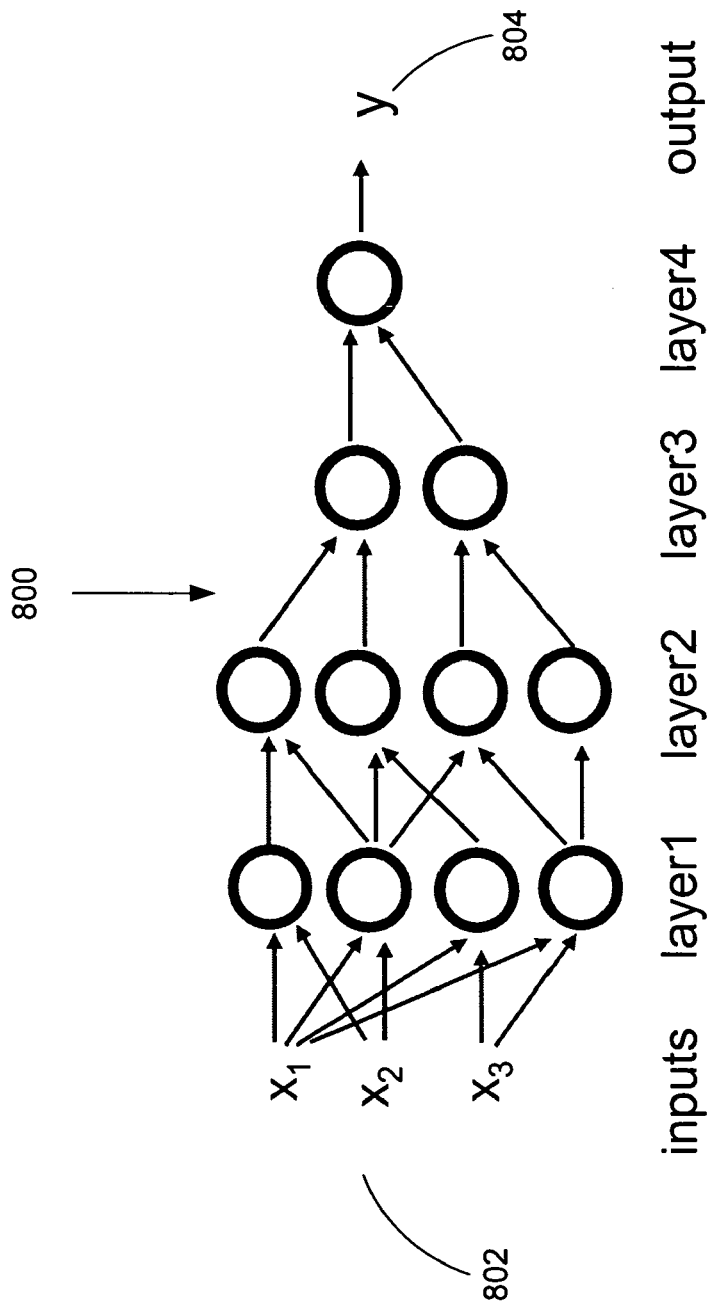

In each sub-region 602, models can developed in a variety of ways such as the polynomial models shown above as well as a variety of neural network models. FIG. 8 shows a neural network model 800 where multiple layers connect inputs 802 to the output 804. This model 800 has been used in other contexts and denoted as a GMBH (Group Method of Data Handling) model. (I A. G. Ivakhnenko, "Polynomial Theory of Complex Systems", IEEE Trans. System, Man, and Cybernetics, Vol. SMC-1, No. 4, October 1971.) In FIG. 8 each neuron has two inputs, and the transfer function is a quadratic polynomial with six coefficients:

$$y=f(x_1,x_2)=a_0+a_1x_1+a_2x_2+a_3x_1^2+a_4x_1^2+a_5x_1x_2. \quad (EQ\ 4)$$

Multiple such neurons are connected into layers to form the entire network. Therefore the network functions are progressively more complex layer after layer. At each layer, the quadratic coefficients are fitted and checked. The fittest functions are passed to the next layer while those with poorer fitting qualities are discarded. This survival-of-the-fittest principle ensures that only the best combinations of input variables are passed to the next layer. To avoid overfitting, if there is no improvement in the quality of fitting after a certain layer, the model building process stops. This self-organizing capability leads to the optimal model complexity.

Figure 9:
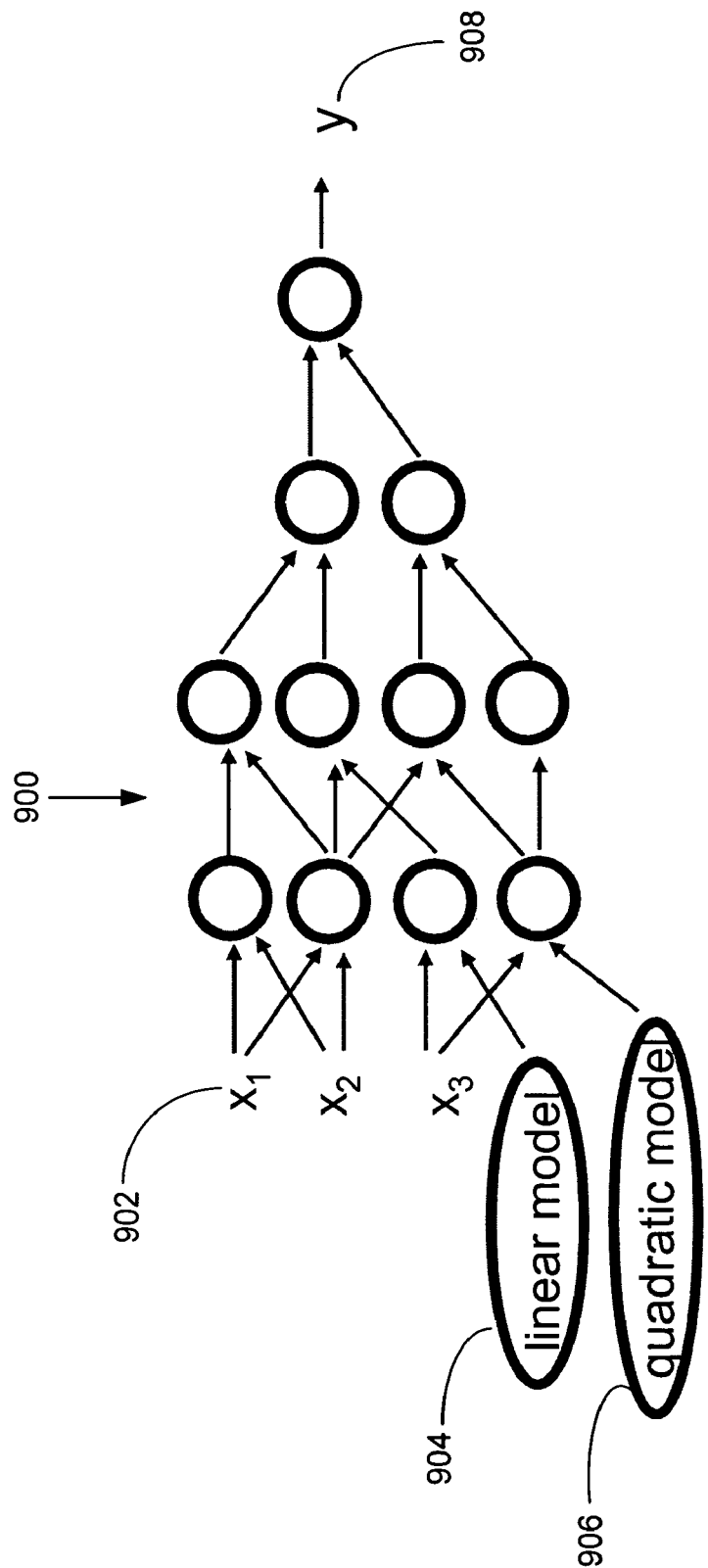

FIG. 9 shows a modified neural network model 900 where multiple layers connect the inputs 902 plus a linear model 904 and a quadratic model 906 to the output 908. To improve the modeling quality, some improvements are applied to the generic GMDH method. It is found that at the earlier layers, the estimations have large errors from the sample values, because only very few input variables are taken into account. For example, at layer one every neuron sees only two input variables, at layer two every neurons sees four input variables. In addition, based on the modeling rules, it is desirable to have partial models that are accurate at the early layers. With this observations, in addition to the original input variables 902, a linear regressor 904 and a quadratic regressor 906 are added to the input layer as shown in FIG. 9. So, at the first layer, the two regressors 904, 906 can take part in the contest with other input variables to improve the overall accuracy. In some experimental contexts, the modified GMDH method achieves consistently better results than the linear and quadratic regressions.

4 Performance-Driven Placement with Simultaneous Rough Routing and Device Tuning In the first iteration 102, performance-driven placement is combined with rough routing 116. (Additionally data on net statistics may be collected for subsequent re-normalization of the data as discussed above.) In the second iteration 104, performance-driven placement is combined with rough routing and device tuning 124. The incorporation of device tuning in the placement step 124 of the seconding iteration 104 desirably compensates for layout-induced performance degradations without going back to circuit resizing. Accuracy in this step 124 is enabled by accurate circuit macromodeling 122.

The goal of the second layout synthesis run 104 is to achieve parasitic closure through fine-grain performance-driven layout optimization. This requires accurate performance estimation 122 which in turn calls for accurate parasitic estimation 114 and performance macromodeling 122. Conventional layout tools separate the processes for placement and routing and the resulting gross parasitic estimation errors during placement are not acceptable for performance-driven layout. Moreover, the difficulties in predicting some basic routing characteristics such as net crossing and coupling, make the resulting placements useless for interconnecting devices in many sensitive RF applications.

According to the present invention, placement can be combined with rough routing 124 so that net parasitics and the number of net crossings are estimated with high accuracy to enable true performance-driven layout. In general, a classical grid-based maze router can be chosen for the rough routing task. This approach is justified by a number of general considerations. First, RF block level circuits are relatively small with typically <30 devices and <20 RF nets, while system level layout can be addressed in a hierarchical manner. Secondly, critical RF nets are wide, typically >5 µm, and RF layouts are sparse due to the large dimensions of most passive devices. These facts permit a large grid, such as 5 µm, to be used. Furthermore, the incremental nature of the simulated-annealing based placer allows incremental routing which greatly improves the speed.

More details related to aspects of performance-driven placement and rough routing with device tuning 124 are provided below. Additional aspects are also presented in application Ser. No. 10/618,237, filed Jul. 11, 2003, and incorporated herein by reference in its entirety.

4.1 Performance-Driven Placement

The placer used 124 can be a simulated-annealing based analog placer (and similarly in the earlier placement step 116). (E. Charbon, E. Malavasi, U. Choudhury, A. Casotto, A. Sangiovanni-Vincentelli, "A Constraint-Driven Placement Methodology for Analog Integrated Circuits", Proc. IEEE Custom Integrated Circuit Conf., May 1992.) Additionally Rough routing is performed for every intermediate placement move. RF net parasitics and couplings are extracted from the routing and the corresponding performances are estimated and included in the overall placement cost function. In addition to performance cost terms and generic layout constraints such as matching and pin assignments, several RF specific cost terms are added. A planarization cost is included to minimize the number of RF net crossings and is a key factor to make synthesized layouts close to manual ones. Placements with unroutable nets are penalized to encourage fully routable placements. RF nets and tunable devices are encouraged to stay close to their nominal values from the last layout to favor convergence. In addition they are encouraged to stay in the macromodel ranges to ensure the validity of the performance models. The overall cost function is formulated as:

$$C_{total}=\alpha_{area}C_{area}+\alpha_{length}C_{length}+\alpha_{overlap}C_{overlap}+\alpha_{perform}C_{perform}+\alpha_{planar}C_{planar}+\alpha_{routable}C_{routable}+\alpha_{range}C_{range}+\alpha_{other}C_{other}. \quad (EQ\ 5)$$

In EQ 5, the $\alpha_i$'s are experimentally chosen weighting factors, and the $C_i$'s are the associated cost terms. The term $C_{other}$ is a lump-sum of the other layout cost terms including device proximity, orientations, layout aspect ratios, etc. Once a performance goal meets its specification, its cost is down weighted to prevent artificial trade-offs among performance goals. The first layout run starts at a high temperature with a full move set in order to find a global optimum, while the second run starts at a much lower temperature with a restricted move set to ensure convergence from the preceding layout.

4.2 Incremental Rough RF Net Routing

The rough router 124 can be a grid-based maze router with relatively large grids (and similarly in the earlier rough-routing step 116). (S. M. Sait, H. Youssef, *VLSI Physical Design Automation: Theory and Practice*, pp. 211-222, IEEE Press, 1995.) The speed requirement is paramount since the router needs to route over ten-thousand intermediate placements for a typical layout run. An incremental routing technique together with a careful choice of grid size and other routing strategies make the router adequate in terms of both speed and quality for this application.

During simulated annealing placement, device placements are incrementally perturbed. In other words, between two consecutive placements only some of the devices are repositioned. As a result, routing can be performed in the same incremental way, e.g., for the second placement only those nets that are affected by the move need to be rerouted. This can be easily implemented by identifying the nets that are connected to or overlapped by the moved devices and other nets that are subsequently affected by those nets. Experiments showed that this technique alone can speed up routing by three to five times.

An advantage of this simultaneous placement and routing strategy is that most routing congestions and other issues can be resolved by the placer, hence the router can be kept simple and fast. Rip-up/reroute is not used to save time. A simple net preorder scheme is used, more specifically, nets are pre-ordered according to their symmetric constraints, sensitivities and estimated lengths. The cost function for the router is also very simple. The primary cost for most nets is just the net length while the performance constraints are enforced by the placer. One issue we found is that even though for many layouts the placer can resolve cross-coupling among nets through proper placements of associated devices, for relatively dense layouts in which sensitive and noisy nets congest in a small area, the placer alone cannot resolve the cross-coupling problem. A quantitative performance-driven router will certainly help to address this issue, but it is desirable to keep the router simple and yet effective. Having this in mind, we introduce noisy nets and sensitive nets to the router in a qualitative manner. During routing, grids within a certain distance to a noisy net have higher cost for corresponding sensitive nets or vise versa. The placer will then evaluate the cross-coupling quantitatively and globally with other performance costs through the macromodel. This approach proves to be adequate. The choice of grid size is a trade-off between routing speed and quality. Experiments showed that a grid size of typical RF net width, e.g., 5-10 μm, is sufficient for accurate routing and is runtime affordable.

Matching and symmetry are essential constraints for analog and RF layouts. Three forms of net symmetry are supported, namely, mirror symmetry, cross symmetry and self symmetry. Mirror symmetry refers to a net pair each of which resides entirely on one side of the symmetry line, while cross symmetry refers to a net pair each of which has portions on both sides of the line. For mirror symmetry, one net is routed on one side while blockages on both sides are checked during search. Once the net is routed its symmetrical partner is simply its image. For cross symmetry and self symmetry, a cross point along the symmetry line is first identified through a heuristic, then one (one side for self symmetry) of the nets is routed to connect the associated terminals and the cross point while image blockage is taken into account. Once one (or one side for self symmetry) net is done, its partner net is simply its image.

4.3 Simultaneous Device Tuning

Simultaneous device tuning 124 is utilized to explore the extra layout flexibility and to increase chance of convergence. During the macromodeling stage before layout, the tunable devices and their tuning ranges are identified with a precondition that within these ranges the circuit performances can be accurately modeled. This is done with the proposed regression tree macromodeling as described earlier. Device tuning is implemented in a way similar to change of device variants during placement. Considering a relatively small number of tunable devices and small tuning ranges, the resulting design space increase is moderate. Furthermore; since the tuning ranges are so small, typically within +/−5%, device tuning usually has no effect on the rough routing. Thus, with our incremental routing strategy, most of the time the preceding routing can be kept. Additional details are presented below in connection with the embodiment shown in FIG. 18.

In this way, the present invention allows the integration 124 of device tuning with placement and rough routing. Using a stochastic optimization engine (e.g., simulated annealing as described above), imposes no constraints on the type of the macromodels so that any sophisticated models can be readily used to solve the device-tuning problem. Furthermore the run-time cost can be minimal compared with other approaches based on geometric programming or other methods of convex optimization. (L. Breiman, J. H. Friedman, R. A. Olshen, C. J. Stone, "Classification and Regression Trees", Belmont, Calif.: Wadsworth, 1984.) (W. Daems, G. Gielen, W. Sansen, "Simulation-Based Automatic Generation of Signomial and Posynomial Performance Models for Analog Integrated Circuits", ACM/IEEE ICCAD, November 2001.)

5 Specific Embodiments

In this section, we first present specific embodiments of the present invention as applied to resizing with parasitic corners for a low noise amplifier (LNA) circuit and a complete synthesis flow on a 10 GHz LNA. Parasitic closure is achieved with only two iterations for these embodiments. To make parasitic estimation more accurate and efficient, an RF net model with net width and length as input variables is used in the synthesis. Without loss of generality, in the following experiments we will fix net width to 10 um and only deal with net lengths.

5.1 Statistical Parasitic-Aware Circuit Resizing of a Low Noise Amplifier

Figure 10:
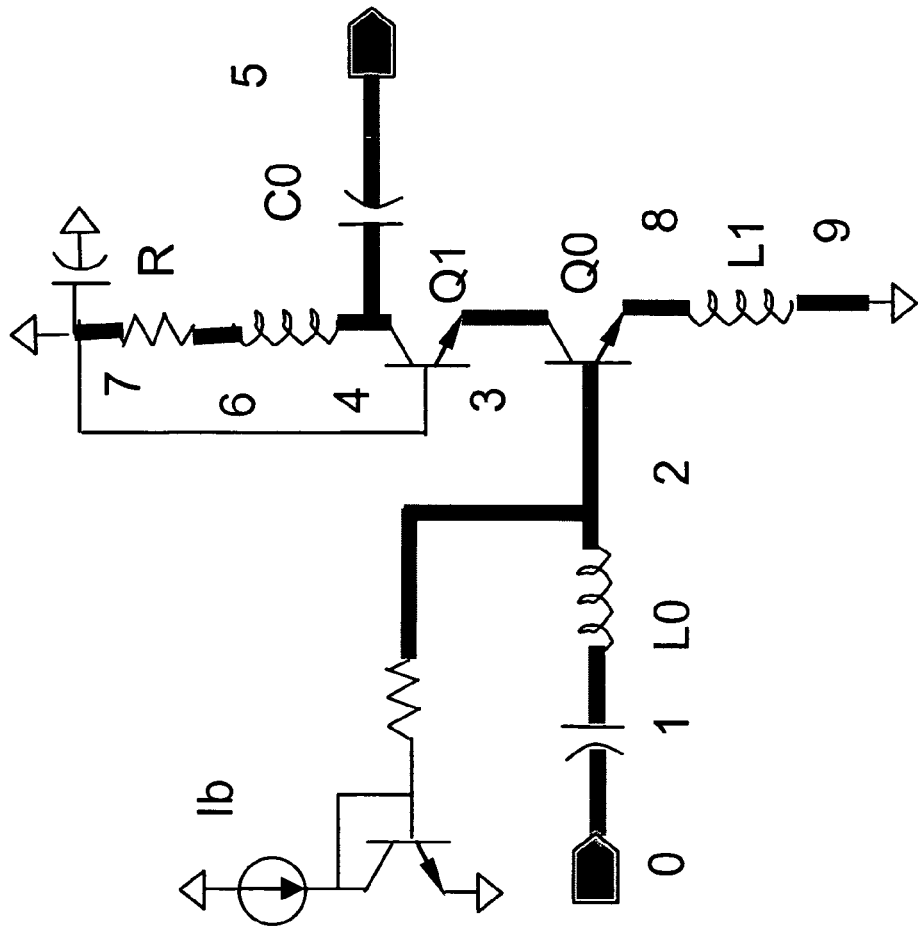
FIG. 10 shows a circuit schematic according to an embodiment of the present invention.

In this section, we perform worst-case parasitic analysis and resizing on a low noise amplifier as a case study to illustrate the method 100. The schematic of the circuit is shown in FIG. 10. There are 10 RF nets as labeled in the schematic, and eight designable parameters, namely, emitter length of $Q_0$ and $Q_1$, diameter of inductor $L_0$, $L_1$ and $L_2$, width of capacitor $C_0$, resistance of R, and bias current $I_{bias}$. And there are six performance goals, namely, S11, S21, S22, NF, IIP3, and Icc. Since we are interested in the resizing step 120 of the second design iteration 104, we assume the circuit is first properly sized 112 followed by the first placement with rough routing 116.

Parasitic samples are generated 302 in the first layout run 102, and the statistics of the critical RF nets in terms of the net lengths are recorded. A set of macromodels are built 304 to model the performances versus the net-lengths.

Figure 11:
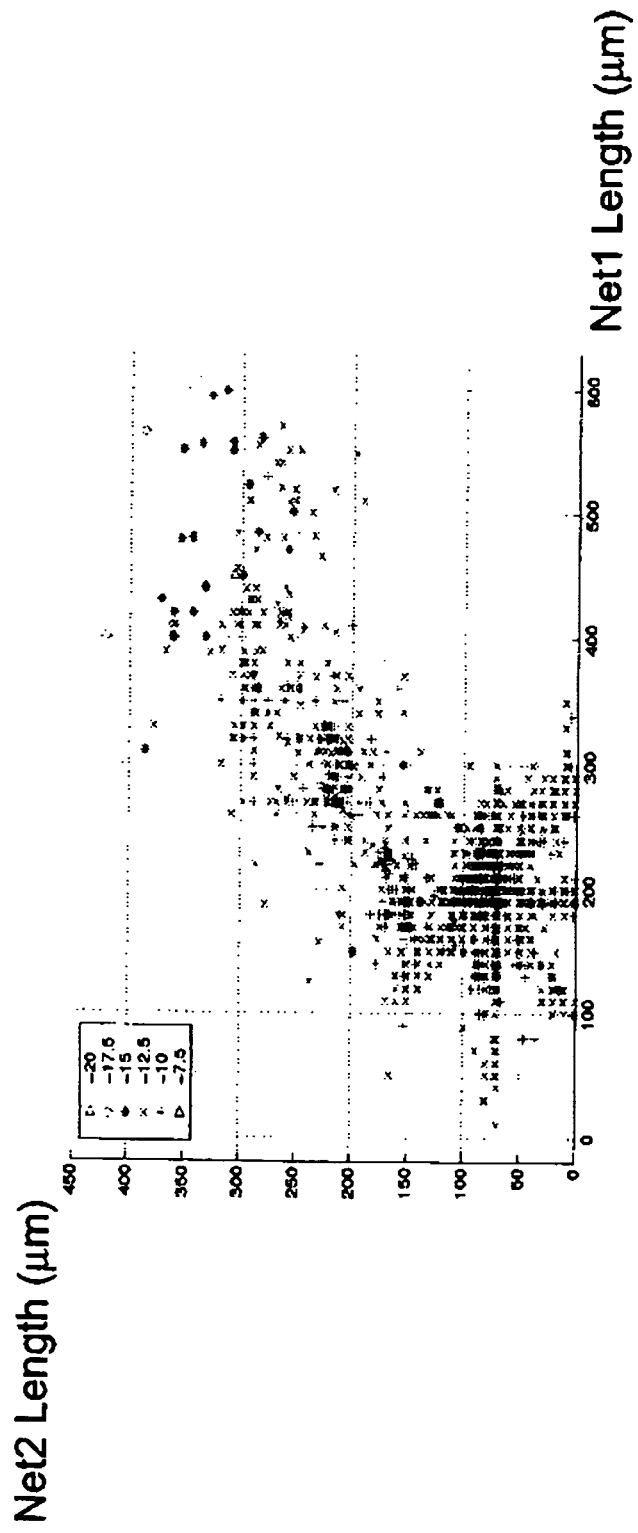
Figure 12:
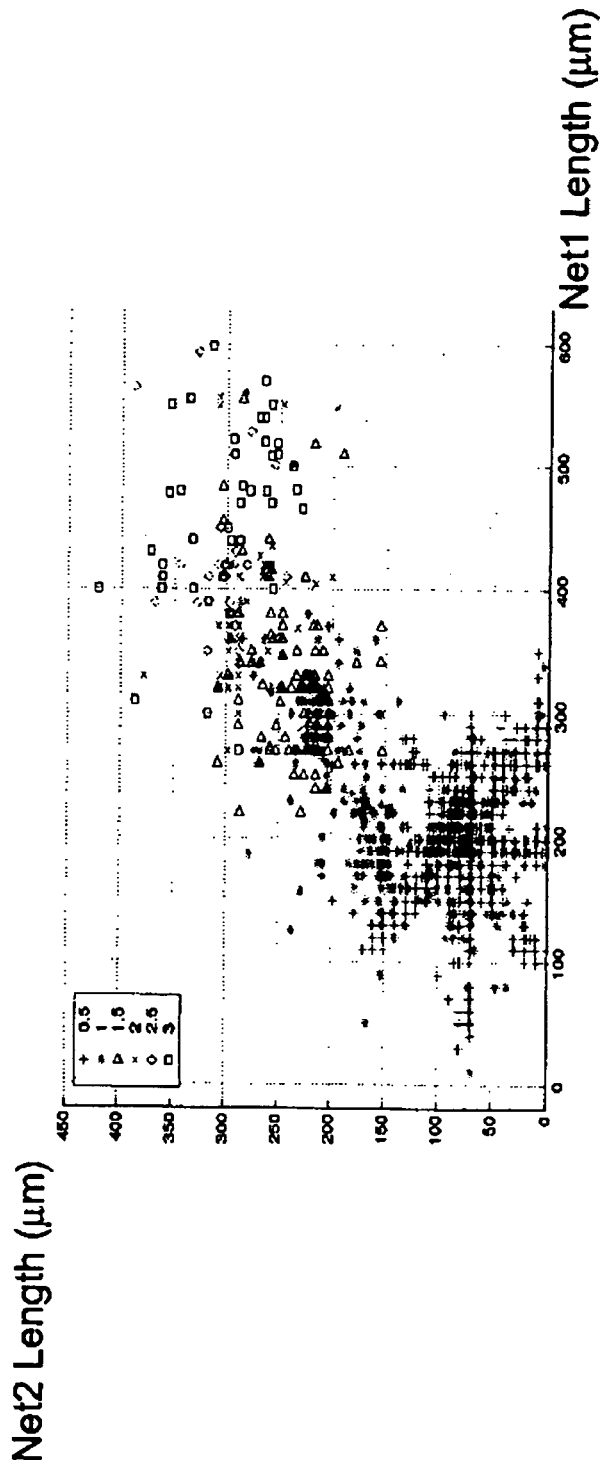
Figure 13:
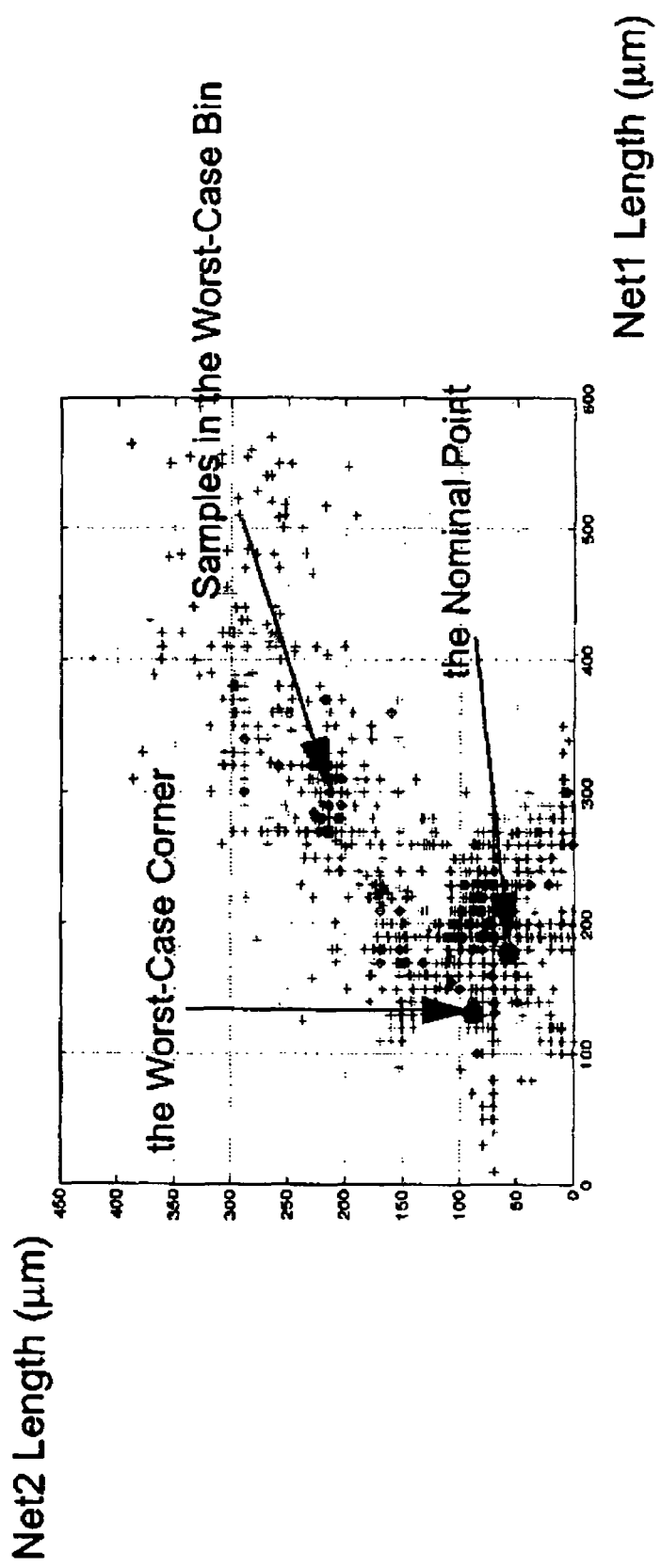
Figure 14:
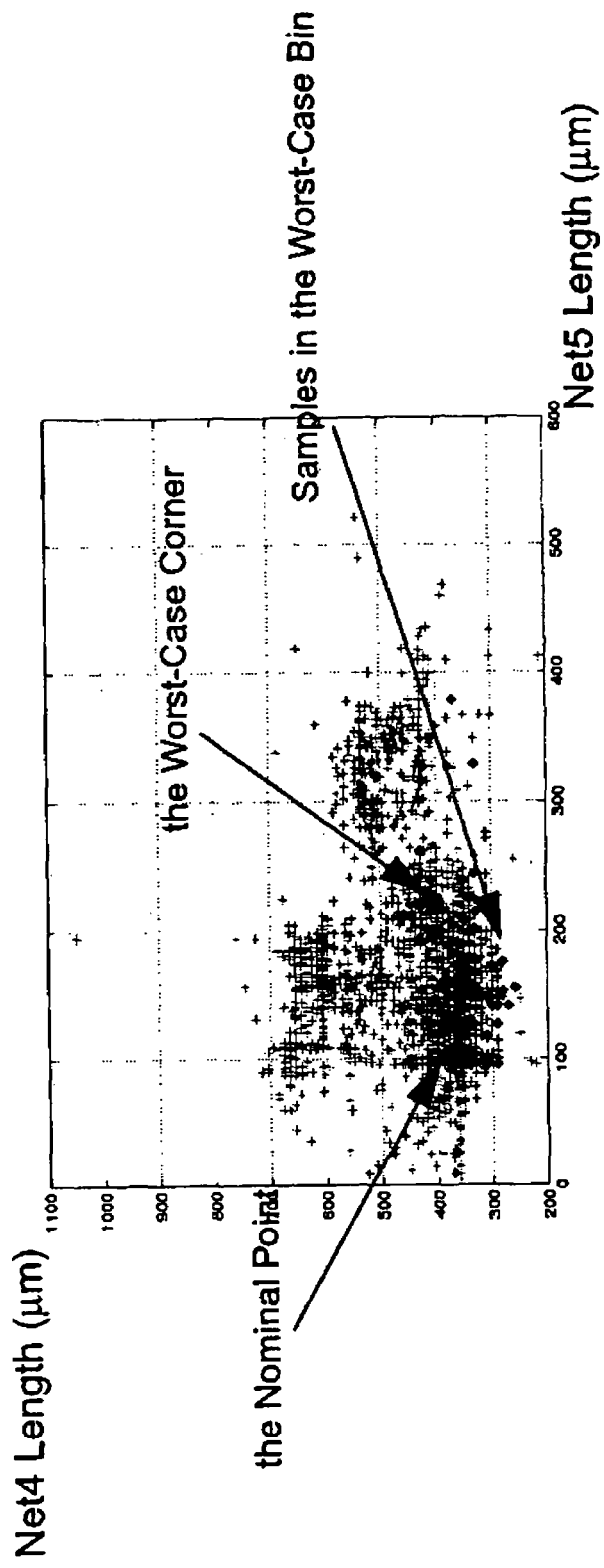

Next, parasitic corners are determined 306. The placements are sorted 306a according to their performances for each performance index. Then the worst-case performance bin is identified 306b assuming a given worst-case probability and a bin size (e.g., a worst-case probability of 10% and a bin size of 1%), a parasitic sample is selected 306c from the worst-case performance bin to optimize layout quality, where the layout quality is measured by the layout cost excluding performance related cost. FIG. 11 shows the scatter plot of the netlengths of two input nets, net1 and net2, grouped by S11 performance. FIG. 12 shows the scatter plot of the same two netlengths grouped by the layout cost derived from the layout run. For the S11 performance, FIG. 13 shows the samples in the worst case bin 1402, the worst-case corner 1404 and the nominal point 1406 (i.e., the result point from the first iteration 102). Similarly, for the S22 performance, FIG. 14 shows the samples in the worst case bin 1502, the worst-case corner 1504 and the nominal point 1506 in a scatter plot with two nets, net4 and net5, at the output.

From this example we can see that the relationships between S11, S22, or layout cost and the netlengths are rather complex. This is partly due to the fact that they are also functions of the netlengths of multiple other nets in the same layout. In addition the distributions and correlations of the netlengths are fairly complex as well. Consequently exact statistical analysis of the problem is difficult and the method 300 shown in FIG. 3 provides advantages over other approaches requiring more detailed statistical analysis.

Figure 15:
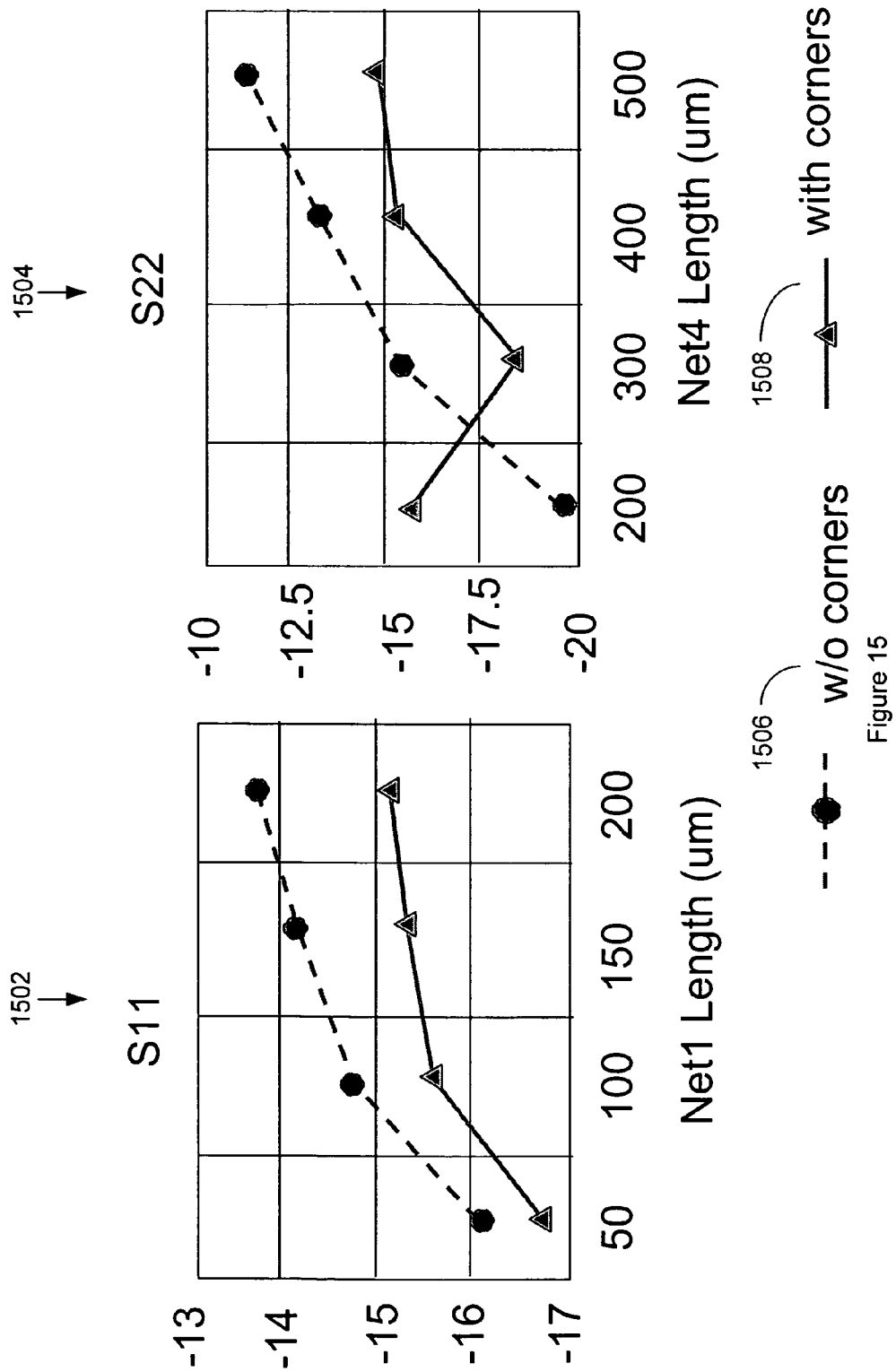

Similarly the worst-case netlength combinations can be identified for other performances in the embodiment shown in FIG. 10. Since for this design only S11 and S22 are sensitive enough, other performances are omitted here. A worst-case parasitic-aware resizing run is performed including the worst-case corners obtained above. To compare with conventional method, a regular resizing with only the normal netlengths from the last layout run was also performed. To show the effectiveness of the new approach, a few likely poor parasitic corners are applied to the resized designs as tests. The results are shown in FIGS. 15 and 16. FIG. 15 shows performances 1502, 1504 for S11 and S22 for resizing with parasitic corners 1504 and resizing without parasitic corners 1508. FIG. 16 shows related tabular results, where the shaded entries indicate that the performance specification was not met.

Clearly the design obtained with the proposed method is much more robust than the one obtained with the conventional method. The resultant designs of the two resizing runs are shown in FIG. 17. A close inspection reveals that the input and output matching networks in the design with parasitic corners have lower quality factor than those in the design with only nominal parasitics. Matching network with lower quality factor is more robust against parasitic variations.

5.2 A 10 GHz SiGe Low Noise Amplifier

Figure 18:
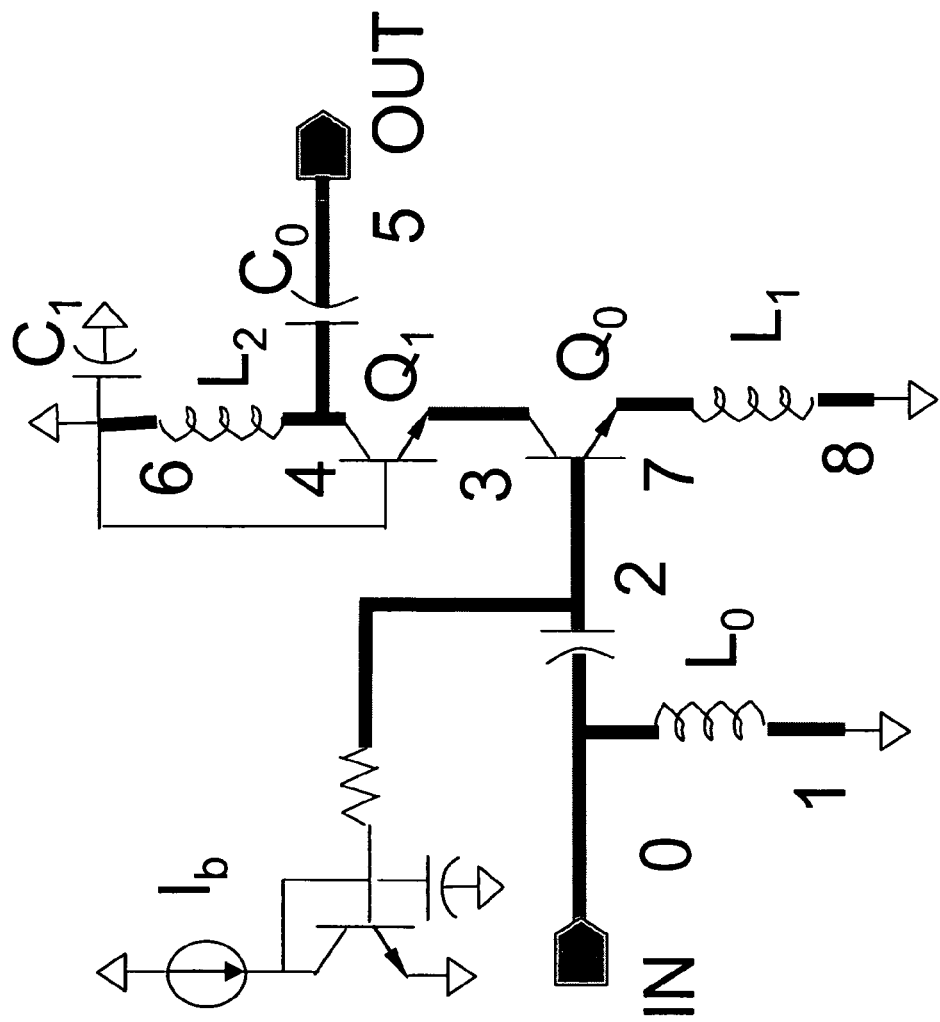
FIG. 18 shows a circuit schematic according to an embodiment of the present invention.

We now demonstrate the whole flow with a 10 GHz low noise amplifier designed for a X-band radar application. The simplified schematic is shown in FIG. 18 and the specifications are shown in FIG. 19.

A total of seven designable parameters are identified for sizing, and their initial sizing ranges are listed in FIG. 20. And as shown in FIG. 18, total of nine nets are identified as sensitive RF nets for parasitic-aware sizing and performance-driven layout. The input nets, e.g., Net0 and Net2 are kept away from the out nets (e.g., Net4 and Net5). The cross-coupling capacitance between them is extracted and considered in the performance constraints. Potentially it can affect all the S parameters. The rough device locations are determined after the pad locations are determined. Pads are grouped and treated as a special class of placeables by the placer. A 60 µm halo is placed around every inductor to ensure isolation. The RF net lengths are estimated from the floorplan and included for the first sizing. The results of the first sizing and placement are shown in FIG. 19. The specifications for S11, S22, are S21 specs were not met with the first placement as shown by the shaded region in FIG. 19. The performances of the placement are obtained through back-annotation of the netlength to the schematic and circuit simulation.

Figure 22:
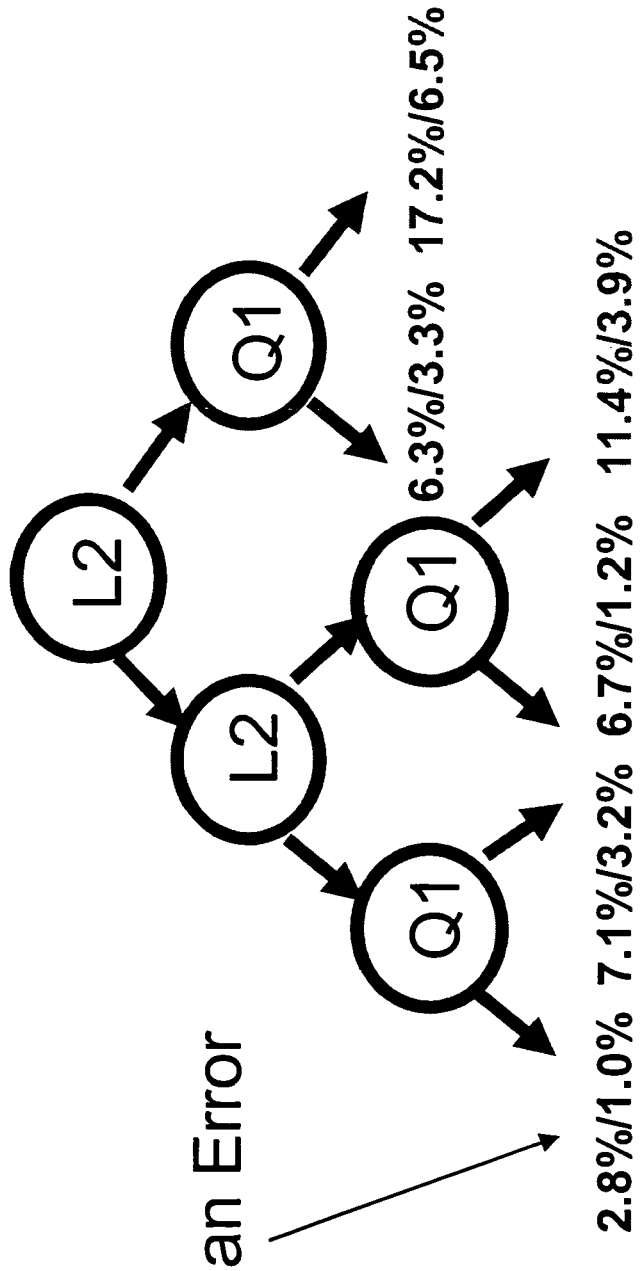

Next a resizing with parasitic-corners are performed. Parasitic-corners of S11, S22 and S21 are identified and included in the resizing. The results of the second resizing and placement are shown in FIG. 19. Before the second placement, performance macromodel is constructed covering tunable devices and RF net parasitics. The variable ranges are shown in FIG. 21, where the device variable ranges are first empirically determined while the RF netlength ranges are obtained from the statistics from the first placement run. Then the device variable ranges are further adjusted by the regression-tree method. Next a regression-tree with a modified GMDH is performed as shown in FIG. 9. Five-hundred samples are simulated and three hundred and fifty of them are used as training samples. To prevent from overfitting, the minimum node size for the regression tree is set to fifty, and the maximum level of partition is set to three. FIG. 22 shows the resultant regression tree for S22. Note that some sub-regions have high modeling errors and are eliminated from the final device tuning ranges. For this experiment, we set max error threshold at 10%. So sub-regions with max model error higher than 10% are eliminated. The modeling results are shown in FIG. 23. In this case, all performances except S22 were be modeled accurately by the GMDH method without partitioning. The final device tuning ranges are shown in FIG. 20 under the column heading "Device Tuning." where the range is indicated by the minimum value, step value and maximum value.

The results of the second placement are listed in FIG. 19, and all of the specifications are met. The second placement with rough routing 2402 is shown in FIG. 24 together with the manually finished final layout 2404. The simulation results of the final layout are shown in FIG. 19. In the manual layout 130, nets were routed following the rough routings. In addition, DC nets, power grid and metal fills were added. The runtime information is based on about 10 Sun blade100's for sizing, and one Sun Ultra10 for placement.

6 Additional Embodiments

Although only certain exemplary embodiments of this invention have been described in detail above, those skilled in the art will readily appreciate that many modifications are possible in the exemplary embodiments without materially departing from the novel teachings and advantages of this invention. For example, aspects of embodiments disclosed above can be combined in other combinations to form additional embodiments. Accordingly, all such modifications are intended to be included within the scope of this invention.

The invention claimed is:

1. A method for synthesizing an IC (integrated circuit), comprising:
    determining a first layout for the IC, the first layout including a first specification of device parameters, placement, and routing, wherein determining the first layout includes determining parasitic statistical data from the first layout; and
    determining a second layout for the IC, the second layout including a second specification of device parameters, placement, and routing, wherein determining the second layout includes:
        using a computer for determining a plurality of first-layout parasitic corners from the parasitic statistical data of the first layout, the first-layout parasitic corners characterizing worst-case samples for a plurality of performance models for the IC;
        determining the device parameters for the second layout by using the first-layout parasitic corners to resize the device parameters of the first layout; and
        determining the placement and the routing for the second layout after determining the device parameters for the second layout.

2. A method according to claim 1, wherein determining the second layout further includes: determining a plurality of performance macromodels for determining the placement and the routing of the second layout, wherein the macromodels calculate performance values from at least some values of the parasitic statistical data.

3. A method according to claim 1, further comprising:
determining if the second layout satisfies a layout performance specification that relates at least some values of the parasitic statistical data to layout performance; and
if the second layout satisfies the layout performance specification, determining a detailed routing for a final layout for the IC.

4. A method according to claim 1, wherein determining the second layout includes determining parasitic statistical data from the second layout, and the method further comprises:
determining if the second layout satisfies a layout performance specification that relates at least some values of the parasitic statistical data to layout performance; and
if the second layout does not satisfy the layout performance specification, determining a third layout for the IC, the third layout including a third specification of device parameters, placement, and routing, wherein determining the third layout includes:
determining a plurality of second-layout parasitic corners from the parasitic statistical data of the second layout, the second-layout parasitic corners characterizing worst-case samples for the performance models;
determining the device parameters for the third layout by using the second-layout parasitic corners to resize the device parameters of the second layout; and
determining the placement and routing for the third layout after determining the device parameters for the third layout.

5. A method according to claim 4, further comprising:
determining if the third layout satisfies the layout performance specification; and
if the third layout satisfies the layout performance specification, determining a detailed routing for a final layout for the IC.

6. A method according to claim 1, wherein the IC is an RFIC (radio frequency integrated circuit) and the performance models include at least one RF gain.

7. A method according to claim 1, wherein determining the parasitic statistical data from the first layout includes determining values for a plurality of intermediate placements, the intermediate-placement values including values for net lengths for interconnects between devices in the IC and at least one corresponding performance value.

8. A method according to claim 1, wherein determining the first-layout parasitic corners includes:
specifying modeling parameters for modeling a functional relationship between one or more parasitic values and one or more performance values;
determining one or more parasitic variations and one or more performance tolerances from the parasitic statistical data; and
determining at least some first-layout parasitic corners by using the modeling parameters to calculate parasitic corner values that are based on the one or more parasitic variations and the one or more performance tolerances.

9. A method according to claim 1, wherein determining the first-layout parasitic corners includes:
separating the parasitic statistical data values into a plurality of bins for different performance values;
selecting a low-performance bin for relatively low performance values; and
selecting at least one parasitic corner from the low-performance bin for relatively high layout value within the low-performance bin.

10. A method according to claim 1, further comprising:
selecting a parasitic test set from the first-layout parasitic corners; and
applying the parasitic test set to the second layout and a nominal layout for comparing performance values of the second layout and the nominal layout.

11. A method according to claim 1, wherein the parasitic statistical data includes variations in net values for fixed device parameter values of the IC.

12. A method according to claim 1, wherein determining the first-layout parasitic corners includes: selecting the worst-case samples from the parasitic statistical data by evaluating the performance models for layouts corresponding to the parasitical statistical data, the parasitical statistical data including net variations about the first layout.

13. A method according to claim 1, wherein determining the first-layout parasitic corners includes: evaluating an electrical performance value for interconnect variations corresponding to the parasitic statistical data.

14. An apparatus for synthesizing an IC (integrated circuit), the apparatus comprising a computer for executing computer instructions, wherein the computer includes computer instructions for:
determining a first layout for the IC, the first layout including a first specification of device parameters, placement, and routing, wherein determining the first layout includes determining parasitic statistical data from the first layout; and
determining a second layout for the IC, the second layout including a second specification of device parameters, placement, and routing, wherein determining the second layout includes:
determining a plurality of first-layout parasitic corners from the parasitic statistical data of the first layout, the first-layout parasitic corners characterizing worst-case samples for a plurality of performance models for the IC;
determining the device parameters for the second layout by using the first-layout parasitic corners to resize the device parameters of the first layout; and
determining the placement and the routing for the second layout after determining the device parameters for the second layout.

15. An apparatus according to claim 14, wherein determining the second layout further includes: determining a plurality of performance macromodels for determining the placement and the routing of the second layout, wherein the macromodels calculate performance values from at least some values of the parasitic statistical data.

16. An apparatus according to claim 14, wherein the computer further includes computer instructions for:
determining if the second layout satisfies a layout performance specification that relates at least some values of the parasitic statistical data to layout performance; and
if the second layout satisfies the layout performance specification, determining a detailed routing for a final layout for the IC.

17. An apparatus according to claim 14, wherein determining the second layout includes determining parasitic statistical data from the second layout, and the computer further includes computer instructions for:
determining if the second layout satisfies a layout performance specification that relates at least some values of the parasitic statistical data to layout performance; and
if the second layout does not satisfy the layout performance specification, determining a third layout for the IC, the third layout including a third specification of device parameters, placement, and routing, wherein determining the third layout includes:
    determining a plurality of second-layout parasitic corners from the parasitic statistical data of the second layout, the second-layout parasitic corners characterizing worst-case samples for the performance models;
    determining the device parameters for the third layout by using the second-layout parasitic corners to resize the device parameters of the second layout; and
    determining the placement and routing for the third layout after determining the device parameters for the third layout.

18. An apparatus according to claim 17, wherein the computer further includes computer instructions for:
    determining if the third layout satisfies the layout performance specification; and
    if the third layout satisfies the layout performance specification, determining a detailed routing for a final layout for the IC.

19. An apparatus according to claim 14, wherein determining the parasitic statistical data from the first layout includes determining values for a plurality of intermediate placements, the intermediate-placement values including values for net lengths for interconnects between devices in the IC and at least one corresponding performance value.

20. An apparatus according to claim 14, wherein determining the first-layout parasitic corners includes:
    specifying modeling parameters for modeling a functional relationship between one or more parasitic values and one or more performance values;
    determining one or more parasitic variations and one or more performance tolerances from the parasitic statistical data; and
    determining at least some first-layout parasitic corners by using the modeling parameters to calculate parasitic corner values that are based on the one or more parasitic variations and the one or more performance tolerances.

21. An apparatus according to claim 14, wherein determining the first-layout parasitic corners includes:
    separating the parasitic statistical data values into a plurality of bins for different performance values;
    selecting a low-performance bin for relatively low performance values; and
    selecting at least one parasitic corner from the low-performance bin for relatively high layout value within the low-performance bin.

22. An apparatus according to claim 14, wherein the computer further includes computer instructions for:
    selecting a parasitic test set from the first-layout parasitic corners; and
    applying the parasitic test set to the second layout and a nominal layout for comparing performance values of the second layout and the nominal layout.

23. A computer-readable medium that stores instructions that when executed by a computer implement a method for synthesizing an IC (integrated circuit), the method comprising:
    determining a first layout for the IC, the first layout including a first specification of device parameters, placement, and routing, wherein determining the first layout includes determining parasitic statistical data from the first layout; and
    determining a second layout for the IC, the second layout including a second specification of device parameters, placement, and routing, wherein determining the second layout includes:
        determining a plurality of first-layout parasitic corners from the parasitic statistical data of the first layout, the first-layout parasitic corners characterizing worst-case samples for a plurality of performance models for the IC;
        determining the device parameters for the second layout by using the first-layout parasitic corners to resize the device parameters of the first layout; and
        determining the placement and the routing for the second layout after determining the device parameters for the second layout.

24. A computer-readable medium according to claim 23, wherein determining the second layout further includes: determining a plurality of performance macromodels for determining the placement and the routing of the second layout, wherein the macromodels calculate performance values from at least some values of the parasitic statistical data.

25. A computer-readable medium according to claim 23, wherein the method further comprises:
    determining if the second layout satisfies a layout performance specification that relates at least some values of the parasitic statistical data to layout performance; and
    if the second layout satisfies the layout performance specification, determining a detailed routing for a final layout for the IC.

26. A computer-readable medium according to claim 23, wherein determining the second layout includes determining parasitic statistical data from the second layout, and the method further comprises:
    determining if the second layout satisfies a layout performance specification that relates at least some values of the parasitic statistical, data to layout performance; and
    if the second layout does not satisfy the layout performance specification, determining a third layout for the IC, the third layout including a third specification of device parameters, placement, and routing, wherein determining the third layout includes:
        determining a plurality of second-layout parasitic corners from the parasitic statistical data of the second layout, the second-layout parasitic corners characterizing worst-case samples for the performance models;
        determining the device parameters for the third layout by using the second-layout parasitic corners to resize the device parameters of the second layout; and
        determining the placement and routing for the third layout after determining the device parameters for the third layout.

27. A computer-readable medium according to claim 26, wherein the method further comprises:
    determining if the third layout satisfies the layout performance specification; and
    if the third layout satisfies the layout performance specification, determining a detailed routing for a final layout for the IC.

28. A computer-readable medium according to claim 23, wherein determining the parasitic statistical data from the first layout includes determining values for a plurality of intermediate placements, the intermediate-placement values including values for net lengths for interconnects between devices in the IC and at least one corresponding performance value.

29. A computer-readable medium according to claim 23, wherein determining the first-layout parasitic corners includes:
    specifying modeling parameters for modeling a functional relationship between one or more parasitic values and one or more performance values;

determining one or more parasitic variations and one or more performance tolerances from the parasitic statistical data; and determining at least some first-layout parasitic corners by using the modeling parameters to calculate parasitic corner values that are based on the one or more parasitic variations and the one or more performance tolerances.

30. A computer-readable medium according to claim 23, wherein determining the first-layout parasitic corners includes:

separating the parasitic statistical data values into a plurality of bins for different performance values;

selecting a low-performance bin for relatively low performance values; and selecting at least one parasitic corner from the low-performance bin for relatively high layout value within the low-performance bin.

31. A computer-readable medium according to claim 23, wherein the method further comprises:

selecting a parasitic test set from the first-layout parasitic corners; and applying the parasitic test set to the second layout and a nominal layout for comparing performance values of the second layout and the nominal layout.

* * * * *